(12) United States Patent
Raykova et al.

(10) Patent No.: US 8,539,220 B2
(45) Date of Patent: Sep. 17, 2013

(54) SECURE COMPUTATION USING A SERVER MODULE

(75) Inventors: Mariana Raykova, New York, NY (US); Seny F. Kamara, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 12/713,206

(22) Filed: Feb. 26, 2010

(65) Prior Publication Data

US 2011/0211692 A1 Sep. 1, 2011

(51) Int. Cl.
*H04L 29/06* (2006.01)
*H04L 9/08* (2006.01)

(52) U.S. Cl.
USPC .......................................... 713/150; 380/278

(58) Field of Classification Search
USPC .......................................... 380/278; 713/150
See application file for complete search history.

(56) References Cited

U.S. PATENT DOCUMENTS

| | | | |
|---|---|---|---|
| 6,834,272 B1 * | 12/2004 | Naor et al. ...................... | 705/80 |
| 7,240,198 B1 * | 7/2007 | Pinkas et al. ................... | 713/168 |
| 8,108,912 B2 | 1/2012 | Ferris | |
| 2003/0074330 A1 | 4/2003 | Asokan et al. | |
| 2005/0201555 A1 | 9/2005 | Yen et al. | |
| 2005/0262009 A1 | 11/2005 | Han et al. | |
| 2008/0082490 A1 * | 4/2008 | MacLaurin et al. .............. | 707/3 |
| 2009/0187757 A1 | 7/2009 | Kerschbaum | |
| 2012/0002811 A1 | 1/2012 | Smart | |
| 2012/0233460 A1 | 9/2012 | Kamara et al. | |

FOREIGN PATENT DOCUMENTS

WO 2006103608 A2 10/2006

OTHER PUBLICATIONS

Goldreich, Oded, "Secure Multi-Party Computation," retrieved at <<http://arbor.ee.ntu.edu.tw/~ylchen/privacy/paper/prot.pdf>>, Department of Computer Science and Applied Mathematics, Weizmann Institute of Science, Rehovot, Israel, 110 pages, Oct. 27, 2002.
Endo, et al., "A Proposal of Encoded Computations for Distributed Massively Multiplayer Online Services," retrieved at <<http://www.cms.livjm.ac.uk/library/AAA-GAMES-Conferences/ACM-ACE/ACE2006/Papers/S07_a19.pdf>>, Proceedings of the 2006 ACM SIGCHI International Conference on Advances in Computer Entertainment Technology, 2006, 6 pages.
Horng, Gwoboa, "A Secure Server-Aided RSA Signature Computation Protocol for Smart Cards," retrieved at <<http://www.iis.sinica.edu.tw/page/jise/2000/200011_04.pdf>>, Journal of Information Science and Engineering, No. 16, 2000, pp. 847-855.

(Continued)

*Primary Examiner* — Peter Shaw

(57) ABSTRACT

A server module evaluates a circuit based on concealed inputs provided by respective participant modules, to provide a concealed output. By virtue of this approach, no party to the transaction (including the sever module) discovers any other party's non-concealed inputs. In a first implementation, the server module evaluates a garbled Boolean circuit. This implementation also uses a three-way oblivious transfer technique to provide a concealed input from one of the participant modules to the serer module. In a second implementation, the server module evaluates an arithmetic circuit based on ciphertexts that have been produced using a fully homomorphic encryption technique. This implementation modifies multiplication operations that are performed in the evaluation of the arithmetic circuit by a modifier factor; this removes bounds placed on the number of the multiplication operations that can be performed.

20 Claims, 15 Drawing Sheets

(56) References Cited

OTHER PUBLICATIONS

"Interactive Proof System," retrieved at <<http://en.wikipedia.org/wiki/Interactive_proof_system>>, Wikipedia entry, retrieved on Oct. 26, 2009, 5 pages.

Cramer, et al., "Multiparty Computation from Threshold Homomorphic Encryption," retrieved at <<ftp://ftp.brics.dk/RS/00/14/BRICS-RS-00-14.pdf>>, Basic Research in Computer Science, BRICS RS-00-14, Jun. 2000, 43 pages.

Canetti, et al., "Universally Composable Two-Party and Multi-Party Secure Computation," retrieved at <<http://citeseerx.ist.psu.edu/viewdoc/download?doi=10.1.1.77.3329&rep=rep1&type=pdf>>, 86 pages, Jul. 14, 2003.

Armknecht, et al., "A New Approach for Algebraically Homomorphic Encryption," retrieved at <<http://eprint.iacr.org/2008/422.pdf, Technical Report 2008/422, IACR ePrint Cryptography Archive, 2008, 18 pages.

Babai, et al., "Checking Computations in Polylogarithmic," retrieved at <<http://citeseerx.ist.psu.edu/viewdoc/download;jsessionid= 7FE8B64AE6EE328C504A6BD8AB3FFC96?doi=10.1.1.42.5832&rep=rep1&type=pdf>>, STOC '91: Proceedings of the Twenty-Third Annual ACM Symposium on Theory of Computing, 1991, 16 pages.

Beaver, et al., "The Round Complexity of Secure Protocols (Extended Abstract)," retrieved at <<http://citeseerx.ist.psu.edu/viewdoc/download?doi=10.1.1.54.6918&rep=rep1&type=pdf>>, Proceedings of the Twenty-Second Annual ACM Symposium on Theory of Computing, 1990, 16 pages.

Damgard, et al., "Scalable Secure Multiparty Computation," retrieved at <<http://www.iacr.org/archive/crypto2006/41170496/41170496.pdf>>, CRYPTO 2006, 2006, 20 pages.

Damgard, et al., "Constant-Round Multiparty Computation Using a Black-Box Pseudorandom Generator," retrieved at <<http://eprint.iacr.org/2005/262.pdf>>, CRYPTO 2005, 20 pages.

Goldreich, et al., "How to Play any Mental Game," retrieved at <<http://homes.cerias.purdue.edu/~crisn/courses/cs590T/cs590T_lect13_mental_game.pdf>>, course presentation for CS 590T, Fall 2004, 40 pages.

Goldreich, et al., "How to Play Any Mental Game," Proceedings of the Nineteenth Annual ACM Symposium on Theory of Computing, 1987, pp. 218-229.

Goldwasser, et al., "Delegating Computation: Interactive Proofs for Muggles," retrieved at <<http://www.mit.edu/~rothblum/papers/del.pdf, STOC '08: Proceedings of the 40th annual ACM symposium on Theory of computing, 2008, 10 pages.

Lindell, Yehuda, "Efficient Fully-Simulatable Oblivious Transfer," retrieved at <<http://eprint.iacr.org/2008/035.pdf>>, extended abstract appears in CRT-RSA 2008, 17 pages.

Peikert, et al., "A Framework for Efficient and Composable Oblivious Transfer," retrieved at <<http://www.mit.edu/~vinodv/papers/OT.pdf>>, version appears in Proceedings of the 28th Annual Conference on Cryptology (CRYPTO '08), 2007, 28 pages.

Yao, Andrew, "Protocols for Secure Computations," retrieved at <<http://www.cs.wisc.edu/areas/sec/yao1982-ocr.pdf>>, IEEE Symposium on Foundations of Computer Science (FOCS '82), 1982, 5 pages.

Lindell, et al., "A Proof of Security of Yao's Protocol for Two-Party Computation," retrieved at <<http://eprint.iacr.org/2004/175.pdf>>, Cryptology ePrint Archive, Report 2004/175, 2004, 21 pages.

Canetti, Ran, "Universally Composable Security: A New Paradigm for Cryptographic Protocols," retrieved at <<http://eprint.iacr.org/2000/067>>, ePrint Archive, Report 2000/067, 2005, 131 pages.

Catrina, et al., "Fostering the Uptake of Secure Multiparty Computation in E-Commerce," retrieved at <<http://www.fkerschbaum.org/fares08.pdf>>, Proceedings of the 2008 Third International Conference on Availability, Reliability and Security, 2008, 8 pages.

Brandt, F.; "Cryptographic Protocols for Secure Second-Price Auctions"; CIA '01 Proceedings of the $5^{th}$ International Workshop on Cooperative Information Agents V; 2001; pp. 154-165.

Miltersen, P. et al.; "Privacy-Enhancing First-Price Auctions Using Rational Cryptography"; Proceedings of the Behavioral and Quantitative Game Theory Conference on Future Directions; 2010; Article 90; 34 pages.

Omote, K. et al.; "A Second-price Sealed-bid Auction with Verifiable Discriminant of poth Root"; Proceedings of Sixth International Conference on Financial Cryptography; 2002; pp. 57-71.

Parkes, D. et al., "Practical Secrecy-Preserving, Verifiably Correct and Trustworthy Auctions", Proceedings of the 8th International Conference on Electronic Commerce: The new e-commerce—Innovations for conquering current barriers, obstacles and limitations to conducting successful business on the internet; Aug. 13-16, 2006; 49 pages.

Tygar, J D.; "Atomicity versus Anonymity: Distributed Transactions for Electronic Commerce", Proceedings of 24th International Conference on Very Large Data Bases; Aug. 24-27, 1998; pp. 1-12.

* cited by examiner

ASSUME GATES 1, 2, AND 3 ARE AND GATES, THUS:

GATE g1

WIRE 1 ($w_{11}$): $K^0_{w11}, K^1_{w11}$

WIRE 2 ($w_{12}$): $K^0_{w12}, K^1_{12}$

WIRE 3 ($w_{13}$): $K^0_{w13}, K^1_{w13}$ $\longrightarrow$

00→0: $\text{Enc}_{K^0_{w11}}(\text{Enc}_{K^0_{w12}}(K^0_{w13}))$

01→0: $\text{Enc}_{K^0_{w11}}(\text{Enc}_{K^1_{w12}}(K^0_{w13}))$

10→0: $\text{Enc}_{K^1_{w11}}(\text{Enc}_{K^0_{w12}}(K^0_{w13}))$

11→1: $\text{Enc}_{K^1_{w11}}(\text{Enc}_{K^1_{w12}}(K^1_{w13}))$

GATE g2

WIRE 1 ($w_{21}$): $K^0_{w21}, K^1_{w21}$

WIRE 2 ($w_{22}$): $K^0_{w22}, K^1_{22}$

WIRE 3 ($w_{23}$): $K^0_{w23}, K^1_{w23}$ $\longrightarrow$

00→0: $\text{Enc}_{K^0_{w21}}(\text{Enc}_{K^0_{w22}}(K^0_{w23}))$

01→0: $\text{Enc}_{K^0_{w21}}(\text{Enc}_{K^1_{w22}}(K^0_{w23}))$

10→0: $\text{Enc}_{K^1_{w21}}(\text{Enc}_{K^0_{w22}}(K^0_{w23}))$

11→1: $\text{Enc}_{K^1_{w21}}(\text{Enc}_{K^1_{w22}}(K^1_{w23}))$

GATE g3

WIRE 1 ($w_{31}$): $K^0_{w13}, K^1_{w13}$

WIRE 2 ($w_{32}$): $K^0_{w23}, K^1_{23}$

WIRE 3 ($w_{33}$): $K^0_{w33}, K^1_{w33}$ $\longrightarrow$

00→0: $\text{Enc}_{K^0_{w13}}(\text{Enc}_{K^0_{w23}}(K^0_{w33}))$

01→0: $\text{Enc}_{K^0_{w13}}(\text{Enc}_{K^1_{w23}}(K^0_{w33}))$

10→0: $\text{Enc}_{K^1_{w13}}(\text{Enc}_{K^0_{w23}}(K^0_{w33}))$

11→1: $\text{Enc}_{K^1_{w13}}(\text{Enc}_{K^1_{w23}}(K^1_{w33}))$ $\vdots$

FIG. 8

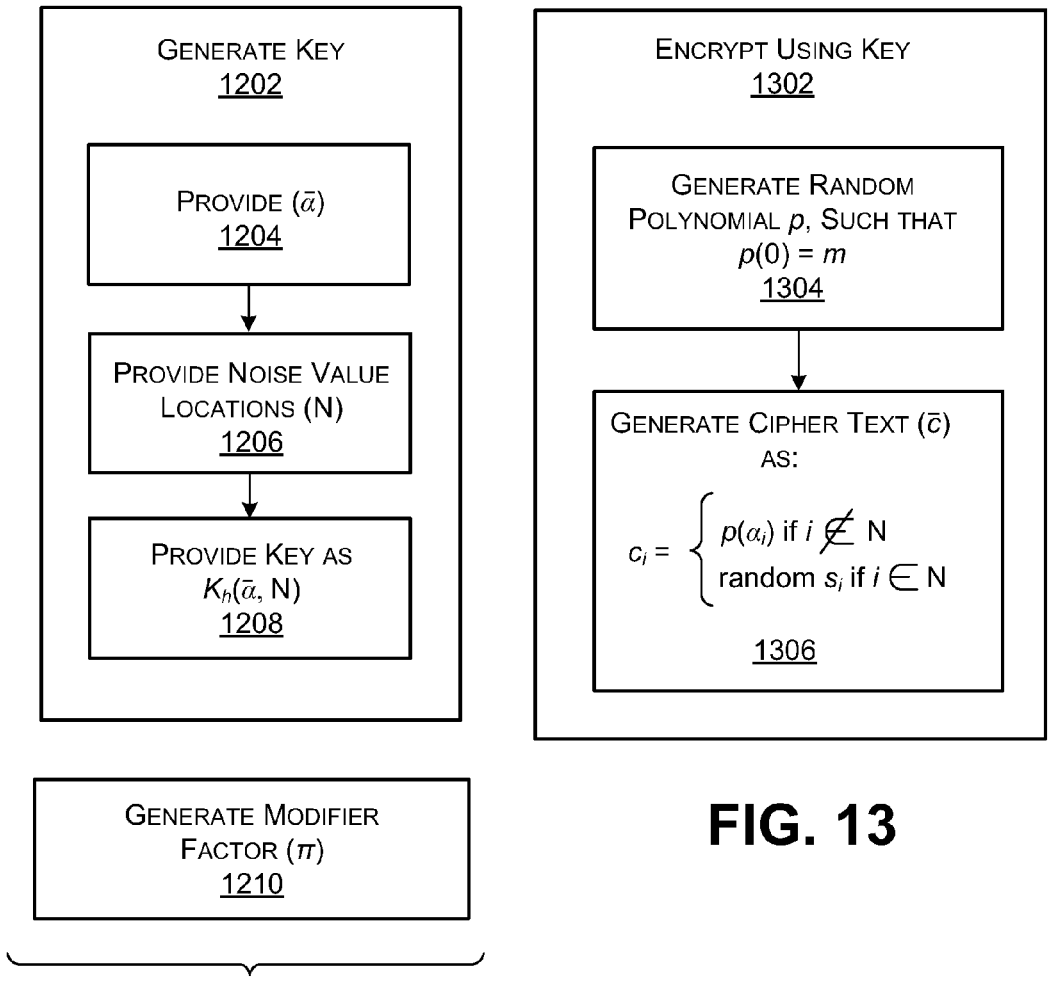

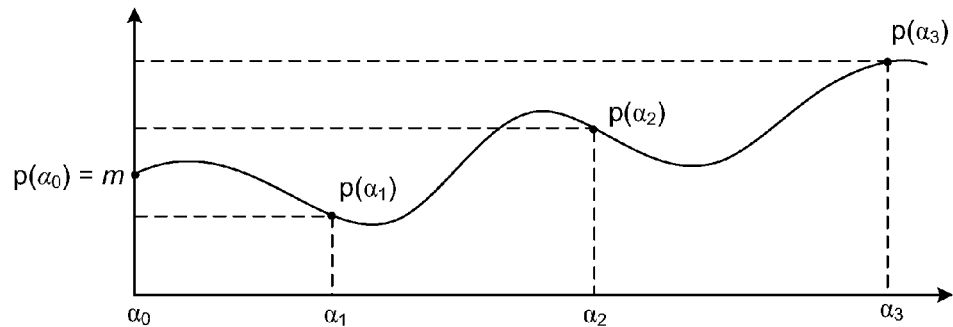
FIG. 14
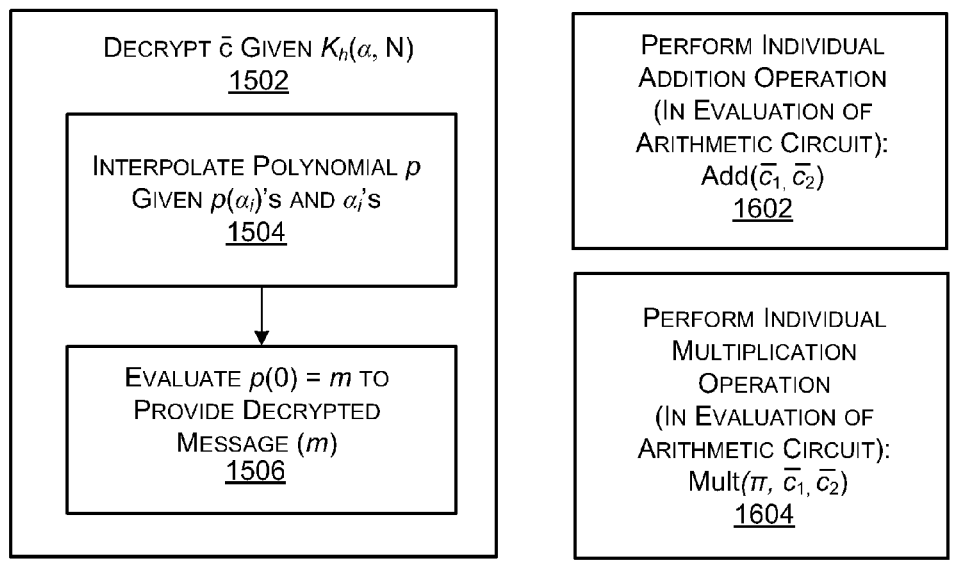
FIG. 15　　FIG. 16

SECURE COMPUTATION USING A SERVER MODULE

BACKGROUND

Cloud computing refers to a technique whereby a first agent can outsource computational tasks to a second agent. The second agent typically corresponds to a server in a remote data processing center. In operation, the first agent provides input data to be processed by the second agent. The second agent processes the data and provides a computation result to the second agent.

The first agent may opt to perform a computation in the above-described manner because it reduces the computational burden placed on the first agent. Further, this manner of computation reduces the need for the first agent to locally provide for robust computational resources. Because of these merits, both individual consumers and organizational entities are expected to make increasing use of cloud computing resources.

However, the cloud computing technique is not without its potential drawbacks. In many cases, the first agent will ask the second agent to perform computations on sensitive data, such as financial data, patient record data, etc. The first agent may not wish to divulge the data to the second agent. Nor will the first agent wish to divulge the data to other entities that also use the services of the second agent.

SUMMARY

An approach is described for performing a processing task in a secure manner using a server module. Generally stated, the approach involves providing a circuit to the server module, where the circuit implements a function using a collection of gates. The server module then receives concealed inputs from a first participant module ($P_A$) and a second participant module ($P_B$). The server module evaluates the circuit based on the concealed inputs, and, in response, generates a concealed output. The server module sends the concealed output to the first and second participant modules. In this case, the concealed output reflects an outcome of processing performed on inputs supplied by two or more participant modules, but this approach can also be used to process an input provided by a single participant module.

By virtue of this approach, the server module learns nothing of the actual (non-concealed) inputs of any of the participant modules. Furthermore, no individual participant module learns anything about the actual (non-concealed) inputs of any other participant module (beyond that which is conveyed by the output of the server module). Hence, this approach leverages the processing capabilities of the server module without divulging sensitive information.

Stated in another way, the approach achieves benefits associated with two-party and multi-party computation. In doing so, however, the approach delegates processing tasks to the server module, rather than the participant modules. This reduces the processing burden placed on the participant modules.

The description sets forth two implementations of the approach described above. In a first implementation, the circuit provided to the server module is a concealed version of a Boolean circuit, e.g., a garbled circuit. Further, this implementation uses a three-way oblivious transfer technique to transfer concealed input to the server module from one of the participant modules. Broadly stated, the three-way oblivious transfer technique allows a participant module to send concealed input to the server module without any party to the transaction learning of inputs to which they are not entitled; the three-way oblivious transfer technique achieves this result even though the participant module that uses this technique is not in possession of any of the keys that are used to conceal its inputs.

In a second implementation, the circuit used by the server module is an arithmetic circuit. In this approach, each participant module produces its concealed input by encrypting its input using a fully homomorphic encryption technique. The server module evaluates the arithmetic circuit based on the concealed inputs to generate a concealed output. The participant modules can decrypt the concealed output using a same key used to encrypt the input.

According to another illustrative aspect, the evaluation of the arithmetic circuit involves at least one multiplication operation that produces a result. The approach involves adjusting the result of the multiplication operation by a modifier factor ($\pi$). The modifier factor is configured to reduce a degree of an underlying polynomial function associated with the result. In this manner, the number of multiplication operations that can be performed in the evaluation need not be bounded a-priori.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 illustrates one manner in which a Boolean circuit can be encrypted.

FIG. 12 is a diagram that sets forth an action flow of a generation module, pertaining to the second implementation.

FIG. 13 is a diagram that sets forth an action flow of an encryption module, pertaining to the second implementation.

FIG. 14 is graph that shows a polynomial function; the polynomial function, in turn, is useful in explaining the operation of an encryption module and decryption module used by the second implementation.

FIG. 15 is a diagram which illustrates an action flow of a decryption module, pertaining to the second implementation.

FIG. 16 is a diagram which illustrates action flows of an addition module and a multiplication module, pertaining to the second implementation.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The disclosure is organized as follows. Section A describes general principles of a system for performing computations in a secure manner using a server module. Section B describes a first implementation of the principles of Section A using a concealed version of a Boolean circuit and a three-way oblivious transfer technique. Section C describes a second implementation of the principles of Section A using an arithmetic circuit in conjunction with a fully homomorphic encryption technique. Section D describes illustrative processing functionality that can be used to implement any aspect of the features described in Sections A-C.

Figure 17:
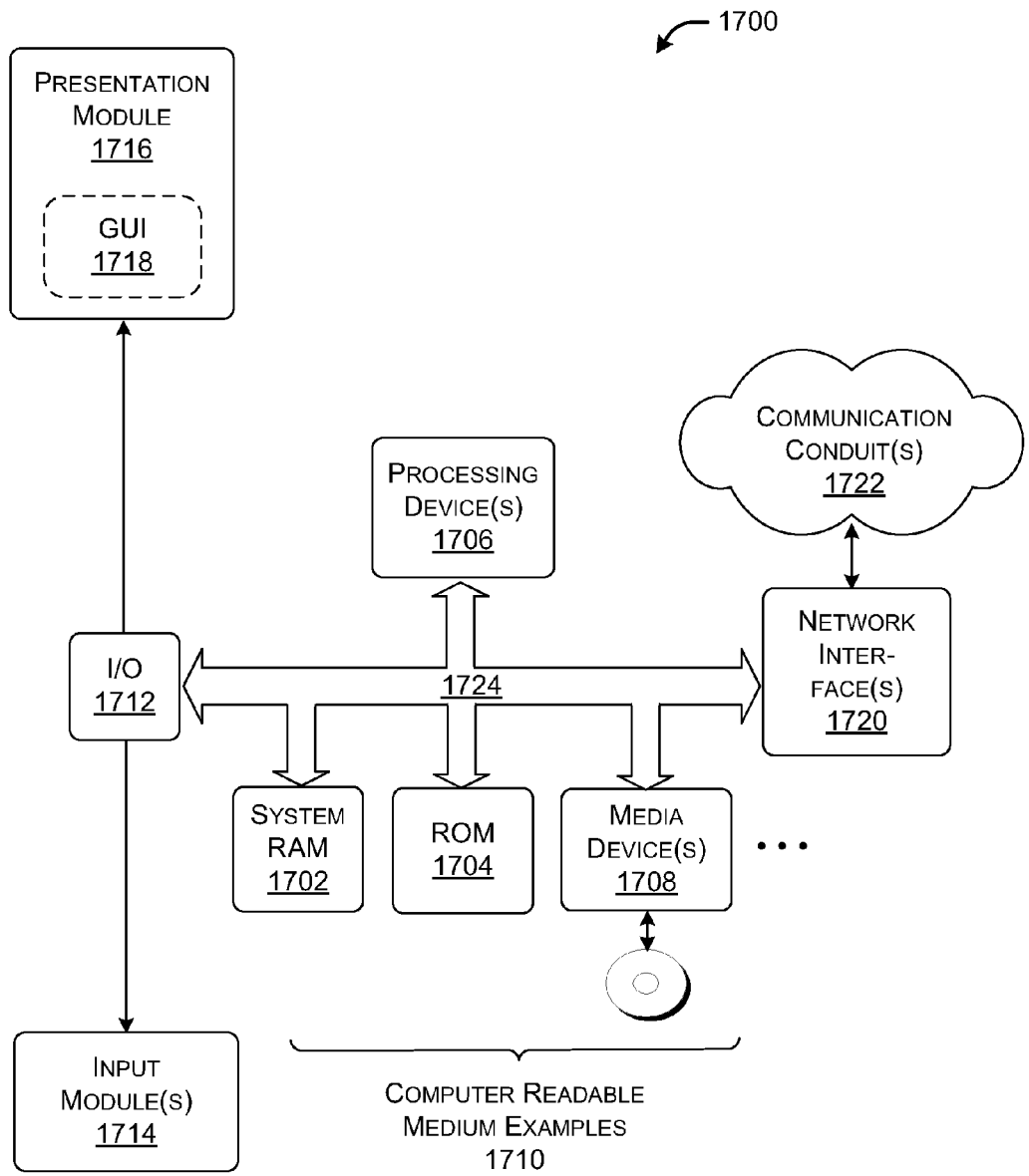
FIG. 17 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 17, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not to be interpreted as an exhaustive indication of features that can be duplicated. Finally, the terms "exemplary" or "illustrative" refer to one implementation among potentially many implementations.

A. Overview

Figure 1:
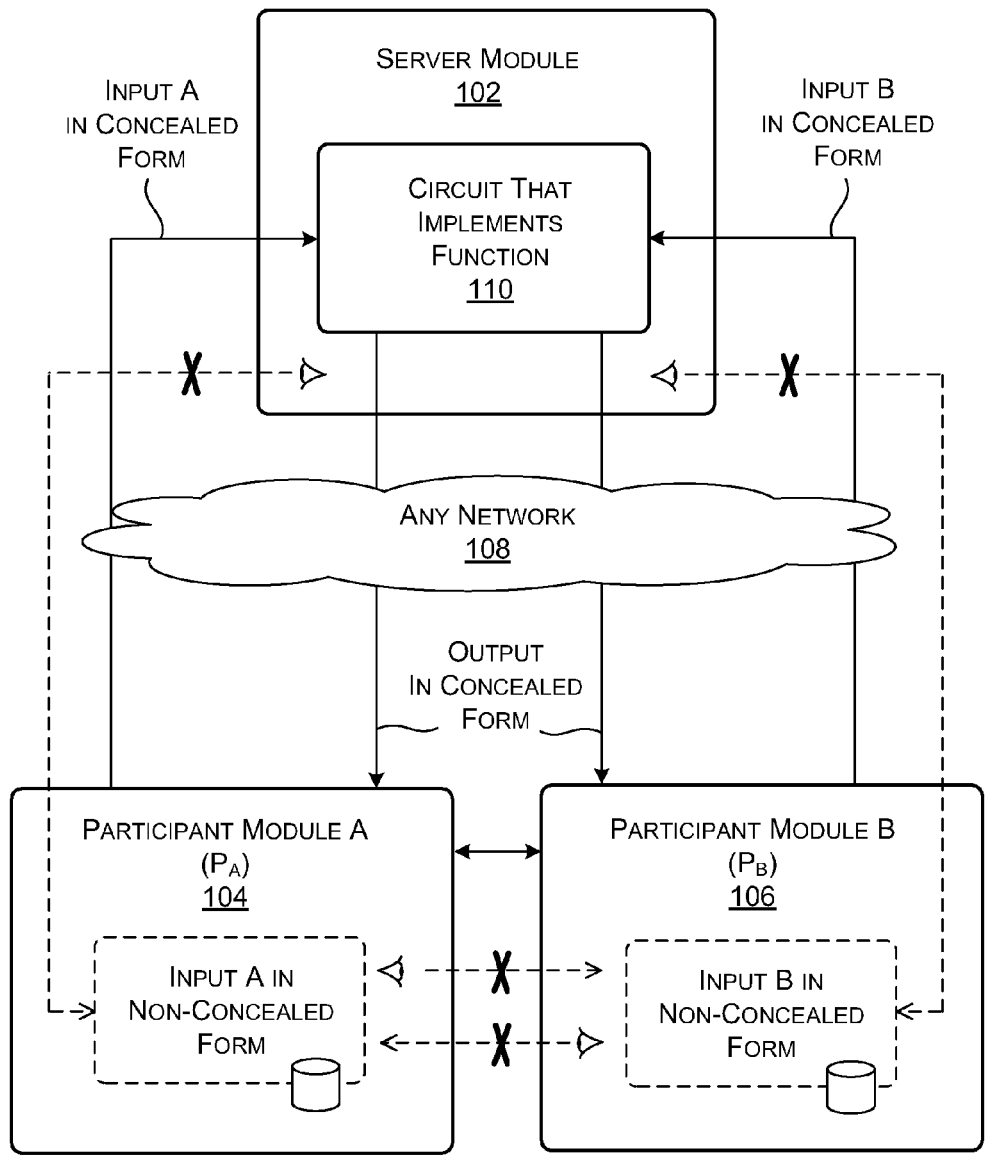
FIG. 1 shows an illustrative system for using a server module to perform a processing task in a secure manner, on behalf of one or more participant modules.

FIG. 1 shows an overview of one illustrative system 100 that includes a server module 102 for performing a processing task on behalf of one or more participant modules. In this example, FIG. 1 shows two participant modules, namely participant module A 104 (referred to below for brevity as $P_A$) and participant module B 106 (referred to below for brevity as $P_B$). However, the server module 102 can provide services to any number of participant modules, including one participant module, or more than two participant modules.

The server module 102 can represent any type of computing functionality. In one case, it corresponds to a computer server that includes processing functionality, input functionality, output functionality, storage functionality, etc. In one scenario, the sever module 102 may represent a processing resource in a cloud computing system, such as a data center that provides a cloud computing service. The server module 102 can represent a single resource provided at a single location or a distributed resource that is distributed over plural locations. For example, the server module 102 can correspond to a single physical machine; alternatively, the server module 102 can represent a virtual server module that maps to corresponding underlying computing hardware in any manner.

Each participant module 104 can likewise represent any type of functionality that includes processing functionality, input functionality, output functionality, storage functionality, etc. In illustrative concrete examples, any participant module can correspond to a stationary personal computing device, a laptop or net book computing device, a personal digital assistant (PDA) computing device, a stylus-type computing device, a mobile phone device, a game console, a set-top box, and so on. FIG. 17, to be described in turn, sets forth one implementation of any processing component shown in FIG. 1.

The server module 102 is connected to $P_A$ 104 and $P_B$ 106 via any type of network 108. The network 108 may represent any type of point-to-point or multi-point coupling mechanism. In one implementation, the network 108 can correspond to a wide area network (e.g., the Internet), a local area network, or combination thereof. The network 108 can include any combination of wireless links, wired links, routers, gateways, etc., as governed by any protocol or combination of protocols. The server module 102 can represent a remote or local resource in relation to any of the participant modules.

In a first scenario, a user or organizational entity may operate $P_A$ 104 to send input data to the server module 102 over the network 108. The server module 102 performs an operation on the input data to generate output data. The server module 102 sends back the output data to $P_A$ 104.

In a second scenario, an entity associated with $P_A$ 104 and an entity associated with $P_B$ 106 may be interested in performing a processing task that involves input provided by both parties ($P_A$ 104 and $P_B$ 106). For example, consider the case in which $P_A$ 104 is associated with a first hospital and $P_B$ 106 is associated with a second hospital. Assume that both hospitals are located in the same city. These two hospitals may be interested in determining the average cost of care of a certain kind in the city, where that average is formed as function of a city-wide data set to which both hospitals contribute. This operation is an example of a joint computation that depends on the inputs of two separate entities. To perform this function, the first hospital uses $P_A$ 104 to send its patient records to the server module 102, and the second hospital uses $P_B$ 106 to send its patient records to the server module 102. The server module 102 then processes the joint inputs provided by these hospitals, produces an output result, and sends the output result to both hospitals. There are many other practical examples of a similar nature, some involving joint computations, and others involving non-joint (independent) computations.

It can be appreciated that there are security concerns associated with outsourcing the type of processing task described above. For example, hospital A may not want to divulge the details about individual patient records to either the server module 102 or the hospital B. Similarly, hospital B may not want to divulge the details about individual patient records to either the server module 102 or hospital A.

In a two-party or multi-party distributed setting (without a server), the above-described challenge is sometimes referred as the millionaire's problem. In this problem, two millionaires want to determine which one of them is richer, but neither wants to disclose his actual net worth to the other. Technology to address this situation in a two-party distributed setting is referred to as two-party computation. Technology which extends these security objectives to more than two participants is referred to as multi-party computation (MPC).

FIG. 1 graphically illustrates the security concerns outlined above by a series of dashed lines that point to potentially sensitive and confidential data. The dashed lines indicates that entity A associated with $P_A$ 104 does not want others to "see" its input to the computation in non-concealed form. Similarly, entity B associated with $P_B$ 106 does not want others to "see" its input to the computation in non-concealed form. A non-concealed form means that the information is readily discoverable. A concealed form means that it is not readily discoverable.

Figure 2:
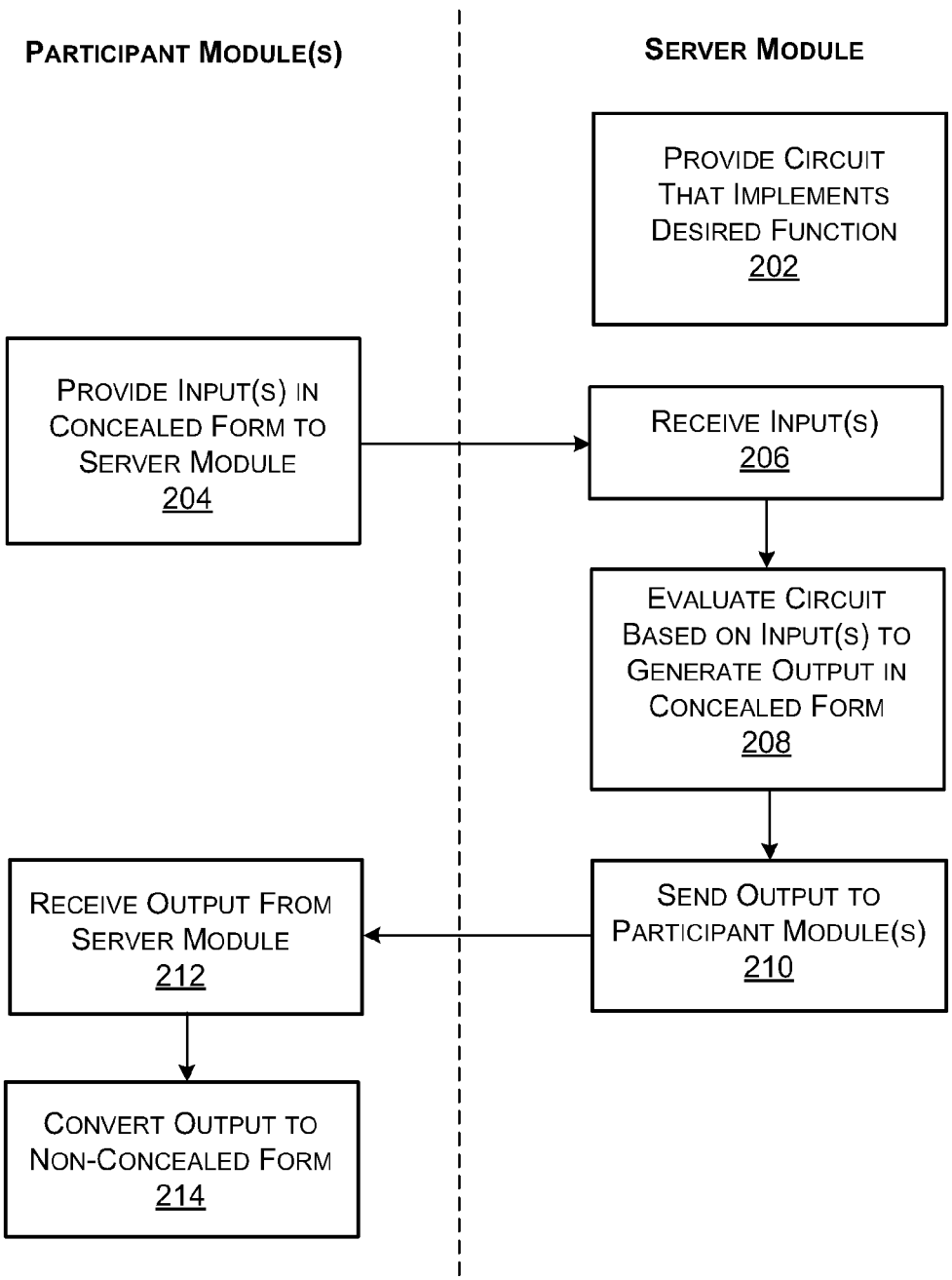
FIG. 2 is a diagram that shows an illustrative action flow of the system of FIG. 1.

FIG. 2 shows an overview of an action flow 200 that explains one way in which the system 100 of FIG. 1 can satisfy the above security concerns. Section B describes a first implementation of this basic approach, while Section C describes a second implementation.

Generally, the server module 102 is treated in a conservative manner as untrustworthy (meaning, for instance, that the server module 102 cannot be trusted to maintain the confidentiality of information provided to the sever module 102). However, in some scenarios, it will be assumed that the server module 102 does not collude with any participant module to circumvent the security provisions described herein. Further, in some scenarios, it will be assumed that the parties to the joint computation are semi-honest entities at worst. This means that the entities can be expected to follow the security protocol (described below). But the entities may try to leverage the information that they discover in the course of this protocol to uncover additional information (to which they are not entitled).

In action 202, the server module 102 receives a circuit 110 that it uses to process the inputs provided by $P_A$ 104 and $P_B$ 106. At this juncture in the explanation, suffice it to say that the circuit is a collection of interconnected gates that perform the function. The first implementation uses a concealed version of a Boolean circuit, where the Boolean circuit includes a plurality of Boolean-type gates (e.g., any of AND, OR, NAND, NOR, etc.). The second implementation uses an arithmetic circuit that includes a plurality of arithmetic gates (e.g., any of addition, multiplication, etc.).

The server module 102 can receive the circuit 110 from any source. For example, in the first implementation, the server module 102 receives a garbled version of the circuit 110 from one of the participant modules, e.g., $P_A$ 104.

In action 204, each of the participant modules provides concealed inputs to the server module 102. In action 206, the server module 102 receives the concealed inputs. The concealed inputs express the inputs of $P_A$ 104 and $P_B$ 106 in a concealed form. Sections B and C will describe two different ways that this concealing operation can be performed.

In action 208, the server module 102 evaluates the circuit 110 based on the concealed inputs received in action 206. This generates an output which is also expressed in a concealed form (e.g., comprising a concealed output).

In action 210, the server module 210 sends the concealed output to the participant modules. In a symmetric case, the server module 210 sends the same output result to all of the participating modules. Otherwise, the server module 210 can send a first concealed output result $y_A$ to $P_A$ 104 and a second concealed output result $y_B$ to $P_B$ 106. In action 212, the participant modules ($P_A$ 104 and $P_B$ 106) receive the concealed output result(s). In action 214, the participant modules convert the concealed output to non-concealed form. Sections B and C will describe two ways that can be used to perform this conversion.

The system 100 thereby maintains the secrecy of sensitive information provided by the participant modules, even though the server module 102 performs a processing task that may be based on the joint inputs provided by plural participant modules. Thus, the system 100 allows the participant modules to proceed as if the server module 102 was a trusted entity, which it is not. According to another potential merit, the system 100 delegates a significant portion of processing burden to the server module 102. This reduces the processing load that is placed on the participant modules. This also reduces resource requirements placed on the participant modules.

Figure 3:
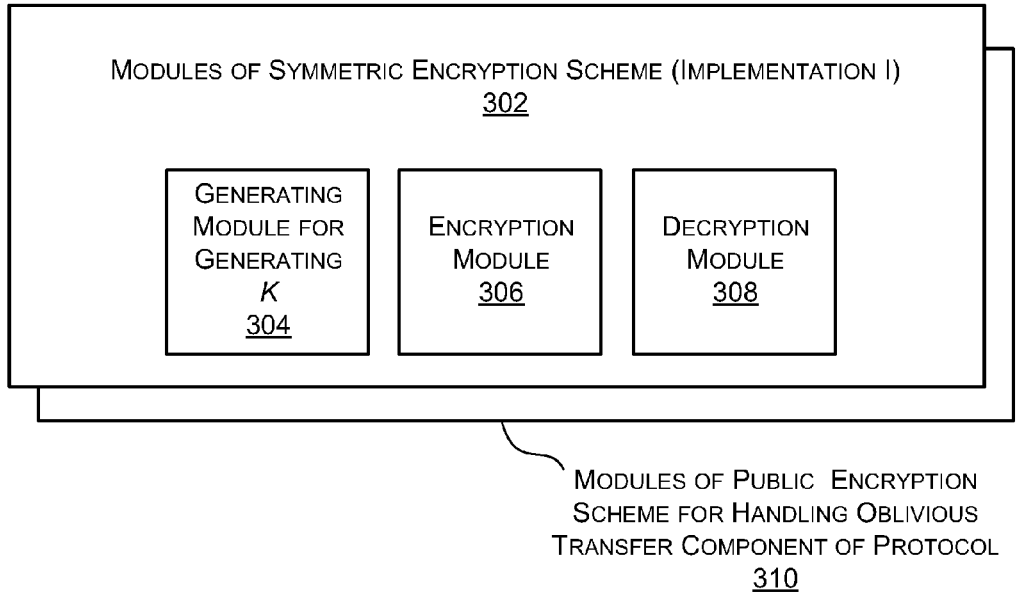
FIG. 3 is an overview of processing modules used in a first implementation (I) of the system of FIG. 1; in this implementation, the server module evaluates a concealed version of a Boolean circuit based on concealed inputs.

FIG. 3 describes processing modules 302 used by different components in the system 100 of FIG. 1 in the first implementation (I). Together, these processing modules 302 describe a private (symmetric) encryption scheme for generating and operating on keys associated with a Boolean circuit (in a manner to be described below in Section B). The processing modules 302 include a generating module 304 for generating a symmetric encryption key, K. The processing modules 302 also include an encryption module 306 for performing encryption on an n-bit message m using the encryption key K to produce ciphertext c. The processing modules 302 also include a decryption module 308 for performing decryption on the ciphertext c using the encryption key K to reconstruct the message m. This encryption scheme is said to be verifiable, which means that it is possible to efficiently verify whether a ciphertext has been encrypted using a given key.

The first implementation makes use of another collection of processing modules 310 for handling a three-way oblivious transfer technique (to be described below). Together these processing modules 310 describe a public encryption scheme, e.g., involving the use of a public key (pk) to encrypt a message and a secret key (sk) to decrypt the message. Although not shown, these processing modules 310 can include a key generating module (for generating pk and sk pairs), an encryption module, and a decryption module.

Figure 4:
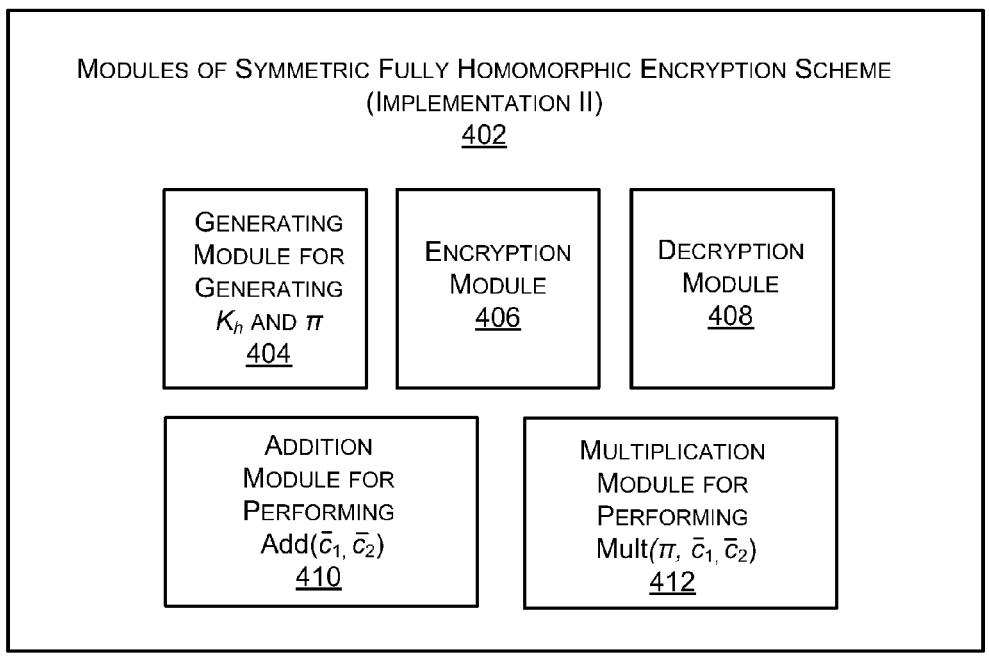
FIG. 4 is an overview of processing modules used in a second implementation (II) of the system of FIG. 1; in this implementation, the server module evaluates an arithmetic circuit based on concealed inputs, where the concealed inputs are produced by performing encryption using a key produced by a homomorphic encryption technique.

FIG. 4 describes processing modules 402 that can be used by different components in the system 100 of FIG. 1 in the second implementation (II). Together, these processing modules 402 describe a private (symmetric) encryption scheme. More specifically, these processing modules 402 constitute parts of a fully homomorphic encryption technique (to be described below in detail in Section C). The processing modules 302 include a generating module 304 for generating a symmetric key $K_h$, together with a modifier factor $\pi$ (where the subscript "h" indicates that this key is generated as part of the fully homomorphic encryption technique). The processing modules 402 also include an encryption module 406 for performing encryption on a message m (associated with an input to an arithmetic circuit) using the encryption key $K_h$ to produce ciphertext c. The processing modules 302 also include a decryption module 408 for performing decryption on the ciphertext c using the encryption key $K_h$ to reconstruct the message m. The processing modules 402 also include an addition module 410 and a multiplication module 412 for performing addition and multiplication operations in the course of evaluating an arithmetic circuit (again, to be described in detail in Section C).

B. Implementation I

Figure 5:
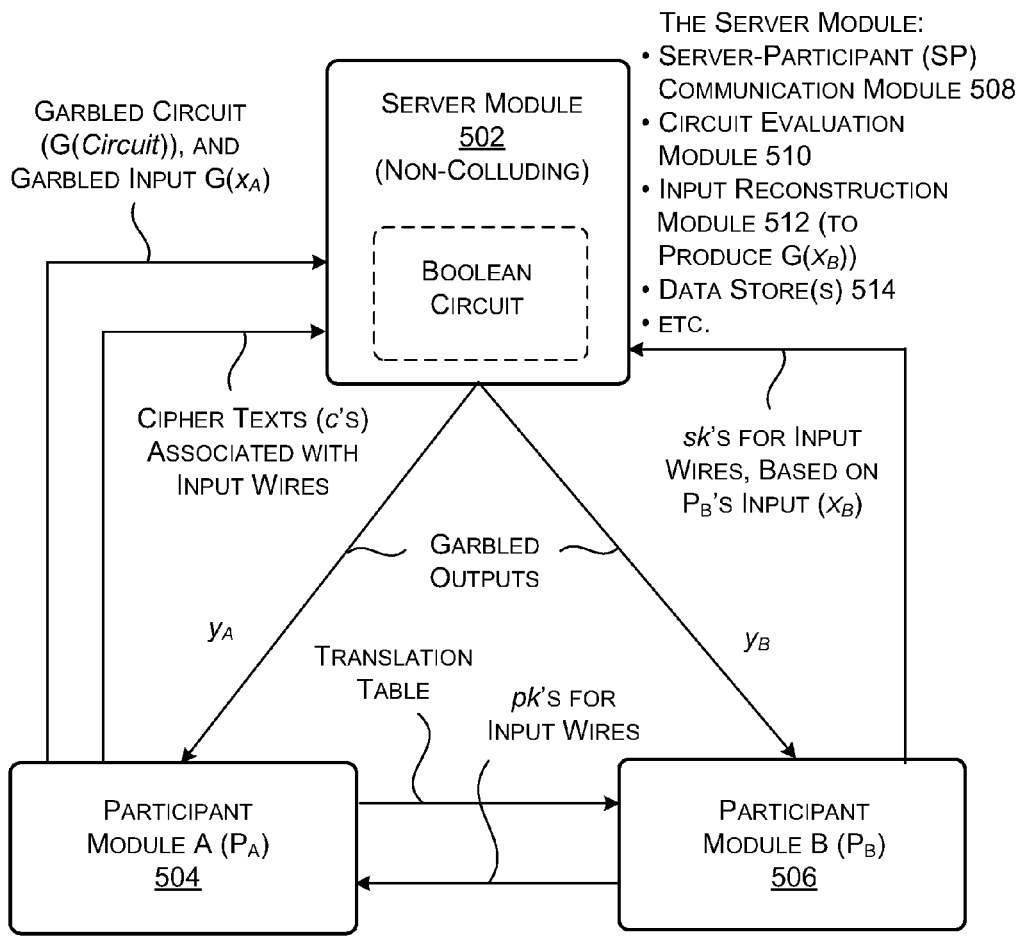
FIG. 5 shows an illustrative system associated with the first implementation.

FIG. 5 shows a system 500 that represents a first implementation of the system 100 shown in FIG. 1. By way of overview, the server module 502 performs processing tasks using a concealed version of a Boolean circuit. Further, the system 500 uses a three-way oblivious transfer technique to transfer inputs in concealed form from one of the participant modules to the server module 106.

The server module 502 provides processing resources for use by two parties, participant module A 504 ($P_A$) and participant module B 506 ($P_B$). The server module 502 is assumed to be untrustworthy, but non-colluding. In one scenario, all of the entities are assumed to be semi-honest at worst.

The component modules of the server module 502 can include: a server-participant (SP) module 508 for communicating with $P_A$ 104 and $P_B$ 106; a circuit evaluation module 510 for evaluating the Boolean circuit to generate a concealed output; an input reconstruction module 512 for reconstructing a garbled input (associated with an input from the $P_B$ 506); one or more data stores 514 for retaining information, etc.

Each participant module can include: a participant-sever (PS) communication module 516 for communicating with the server module 502; a participant-participant (PP) communication module 518 for communicating with other participant modules; a circuit generation module 520 for generating the Boolean circuit (for transfer to the server module 502); a circuit concealment module 522 for garbling the Boolean circuit; an input concealment module 524 for concealing input provided to the server module 502; an output evaluation module 526 for processing concealed output from the server module 502; one or more data stores 528 for retaining information in concealed and/or non-concealed form, etc.

Figure 6A:
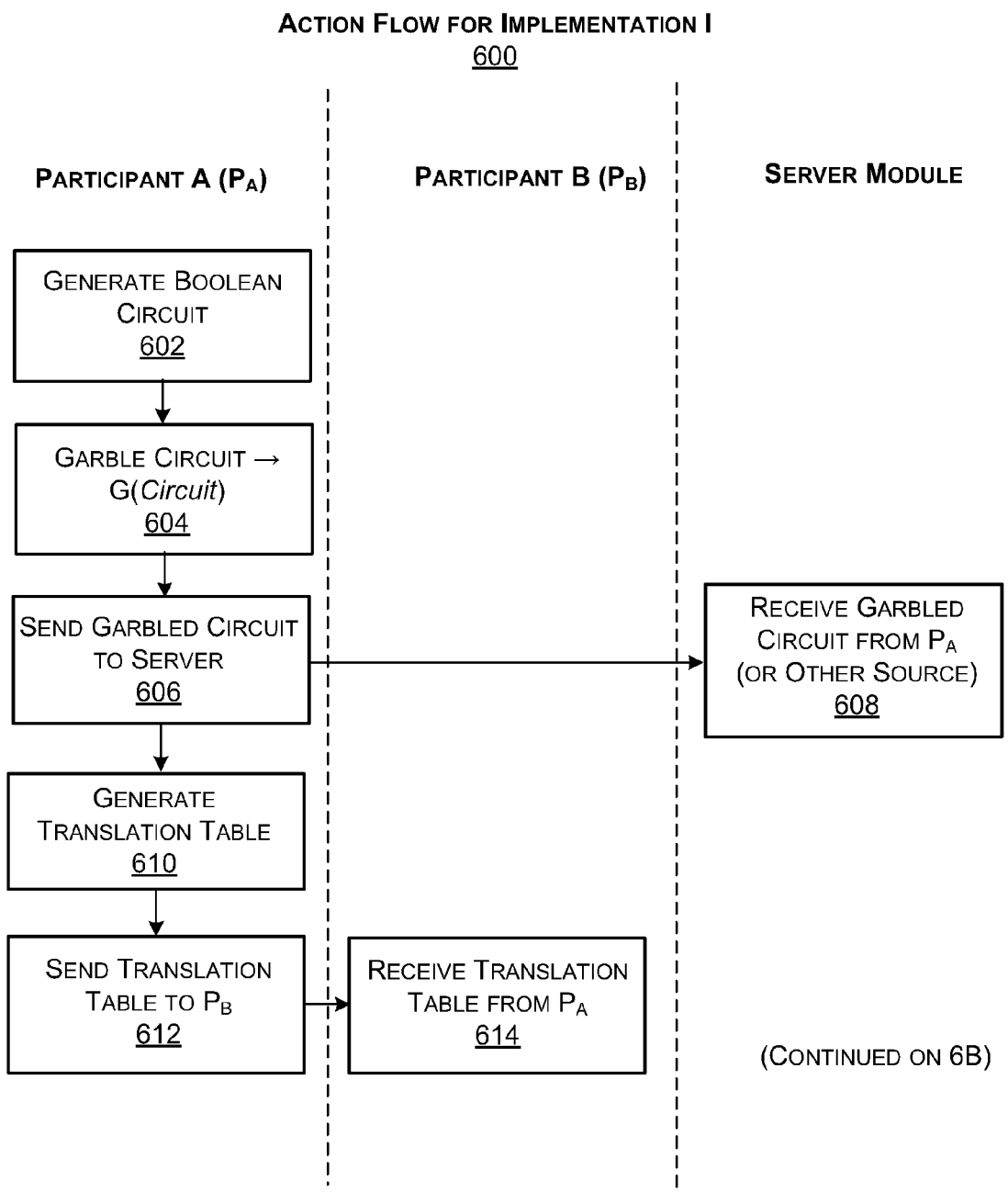
FIGS. 6A, 6B, and 6C together form a diagram that sets forth an illustrative action flow of the system of FIG. 5.
Figure 6B:
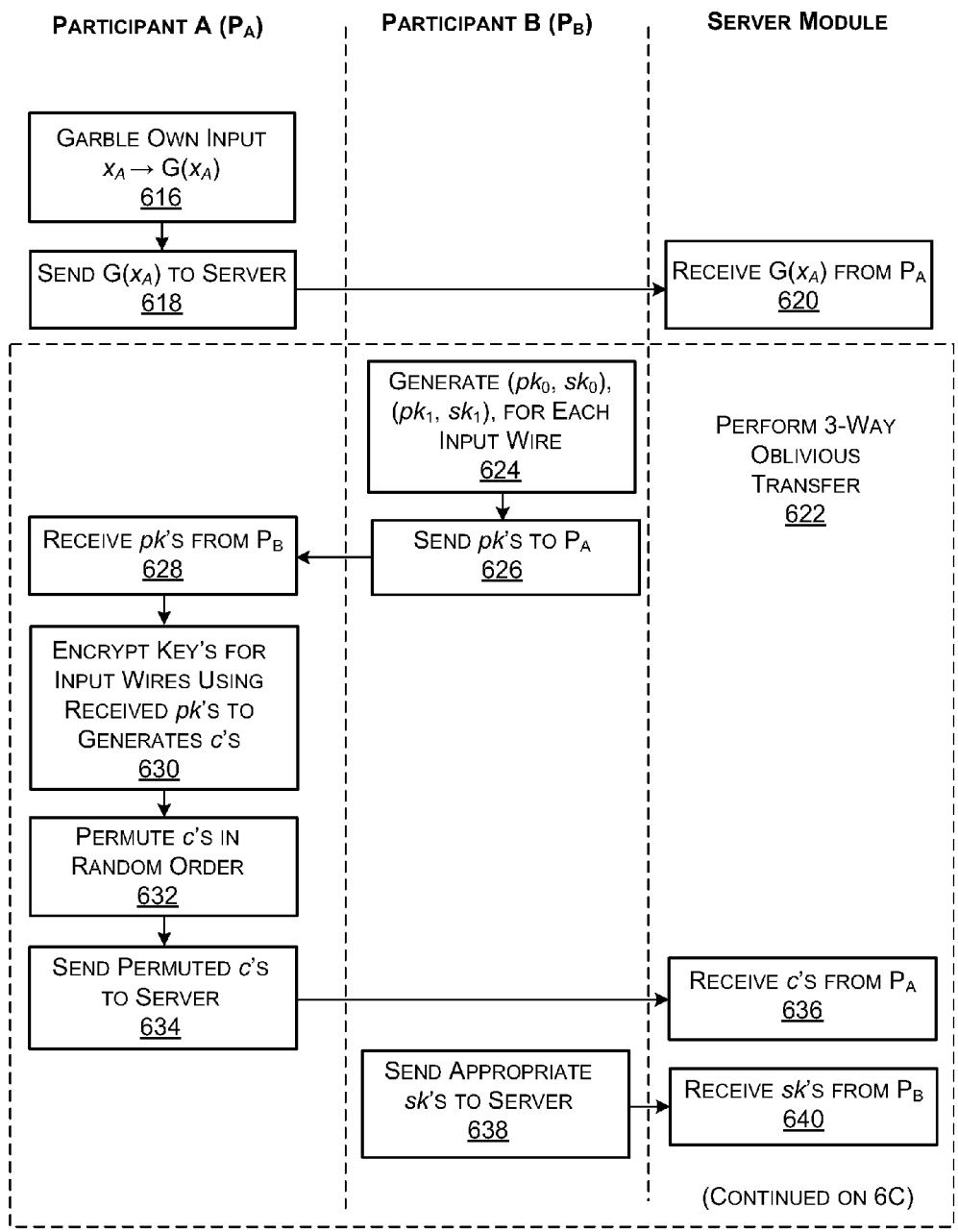
Figure 6C:
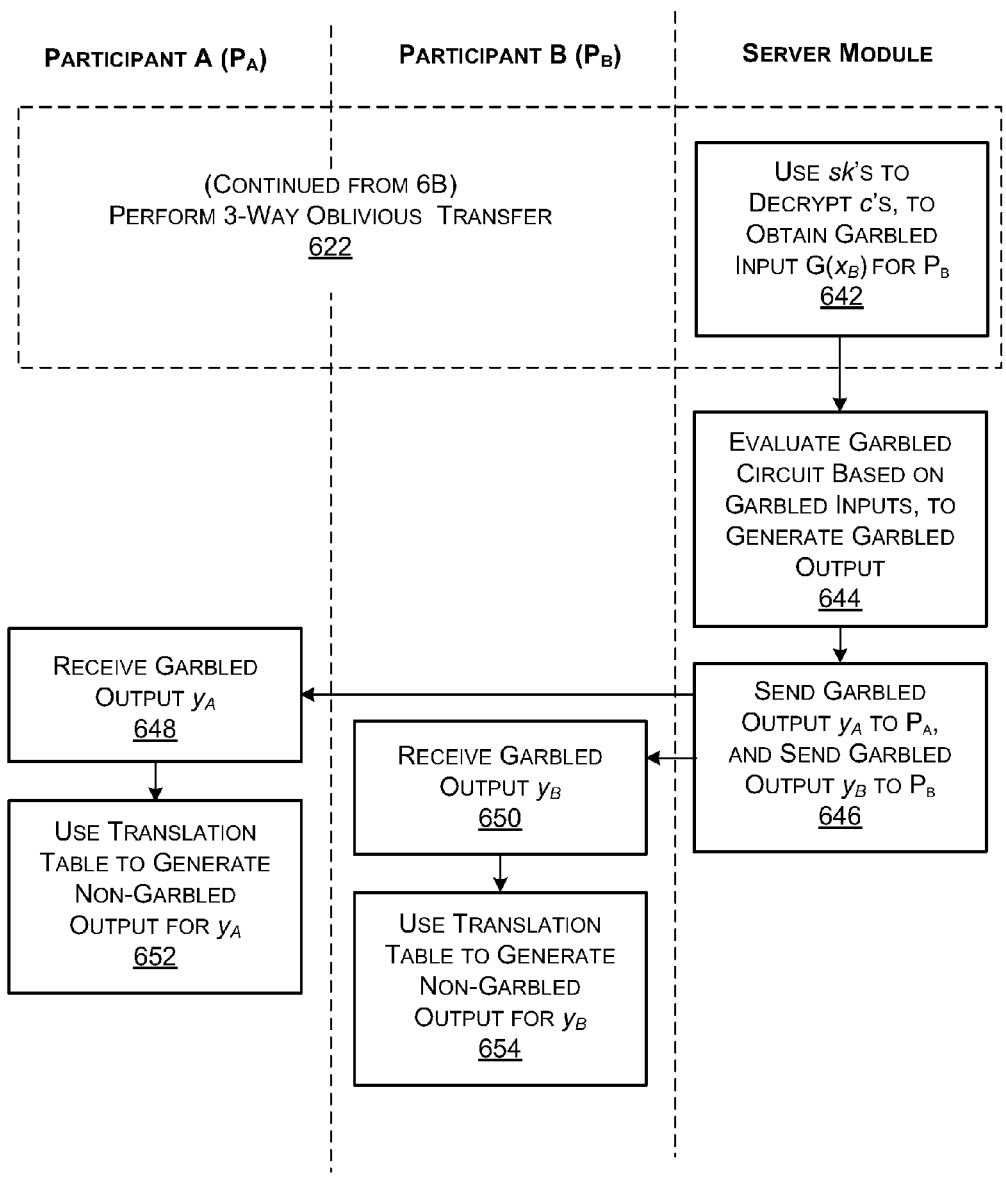

FIGS. 6A, 6B, and 6C collectively show an illustrative action flow 600 that explains one manner of operation of the system 500 of FIG. 5. In this example, the operations performed by the $P_A$ 504 and the $P_B$ 506 can be reversed, e.g., where $P_A$ 504 performs the operations that are presently delegated to $P_B$ 506.

Starting with FIG. 6A, this portion of the action flow 600 describes a procedure for creating and garbling a Boolean circuit. This portion of the action flow 600 will be described in conjunction with the examples presented in FIGS. 7, 8, and 9.

In action 602, the $P_A$ 504 generates the Boolean circuit. In other implementations, other entities can create the Boolean circuit.

In action 604, the $P_A$ 504 garbles the circuit to produce a garbled circuit, G(Circuit), also more generally referred to herein as a concealed version of the Boolean circuit. Garbling consists of encrypting the contents of the Boolean circuit in a manner to be described below. In action 606, the $P_A$ 504 sends the garbed circuit G(Circuit) to the server module 502. In action 608, the server module 502 receives and stores the garbed circuit G(Circuit).

In action 610, the $P_A$ 504 produces a translation table. The translation table is used to map a garbled output of the garbled circuit to an actual (non-concealed) output result. In action 612, the $P_A$ 504 sends the translation table to $P_B$ 506 (for its eventual use in interpreting the garbled output produced by the sever module 502). In action 614, the $P_B$ 506 receives and stores the translation table.

Figure 7:
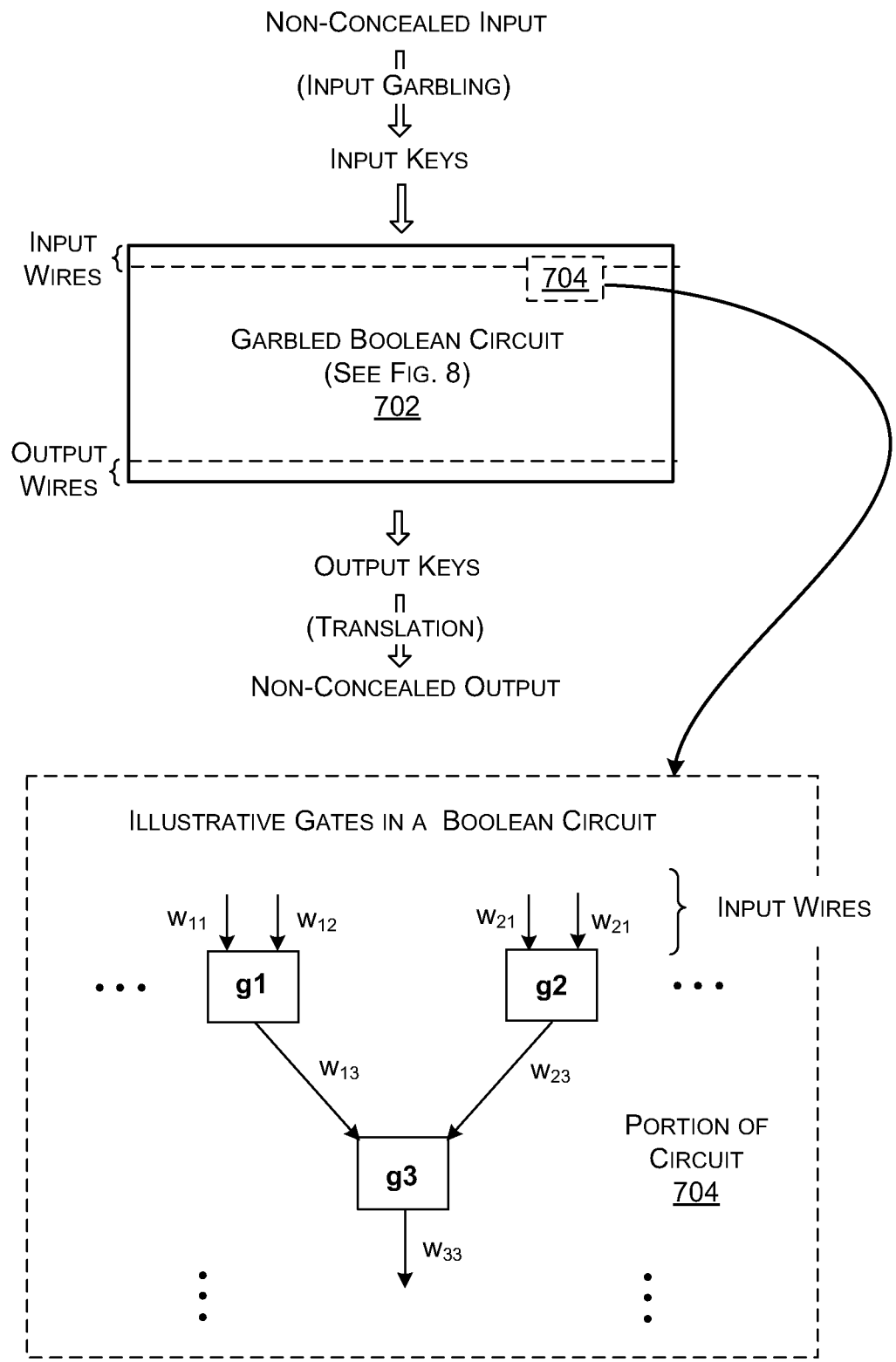
FIG. 7 depicts features of an illustrative Boolean circuit.

Advancing to FIG. 7, this figure provides additional detail regarding the characteristics of a garbled Boolean circuit 702. Generally, a Boolean circuit comprises a directed acyclic graph that contains n inputs nodes, m output modes, and s gates. The gates perform Boolean operations, e.g., any combination of AND operations, OR operations, NAND operations, NOR operations, etc. Taken together, the gates map an input to an output based on some function. For example, assume that the task assigned the server module 502 is to calculate an average operating cost for two franchise stores. In this case, the Boolean circuit includes an input which receives the sales data (in garbled form) from the two stores, a collection of gates which perform the averaging function, and an output which provides the outcome of the averaging operation (in garbled form).

More specifically, consider a portion 704 of a particular Boolean circuit 702 that includes three AND gates (where the actual Boolean circuit may include many more gates that are not shown, possibly of different kinds). In one implementation, each gate includes two input "wires," each for receiving a binary input (e.g., 0 or 1). Further, each gate includes an output wire for providing a binary output (e.g., 0 or 1) which reflects an output of processing performed by the gate. For example, a first gate ($g_1$) includes input wires $w_{11}$ and $w_{12}$, and output wire $w_{13}$. A second gate ($g_2$) includes input wires $w_{21}$ and $w_{22}$, and output wire $w_{23}$. Further, in this case, assume that the first gate and the second gate are members of an input layer of the Boolean circuit that receives input supplied to the Boolean circuit. Hence, the wires $w_{11}$, $w_{12}$, $w_{21}$, and $w_{22}$ are referred to as input wires, representing a subset of such input wires provided by the Boolean circuit.

A third gate ($g_3$) receives, as its inputs, the output of gates $g_1$ and $g_2$. That is, the gate $g_3$ includes input wires $w_{13}$ (the output wire of the first gate $g_1$) and $w_{23}$ (the output wire of the second gate $g_2$). For this reason, the third gate $g_3$ is a member of a layer that this is subordinate to the input layer within the Boolean circuit.

In the garbling action 604, the $P_A$ 504 first assigns keys to each of the wires in the Boolean circuit (a portion 704 of which is shown in FIG. 7). For instance, see FIG. 8. As shown there, the $P_A$ 504 assigns two keys to each wire, a first key corresponding to binary value 0 and a second key corresponding to binary value 1. For example, consider the first wire $w_{11}$ of the first gate ($g_1$). The action 604 assigns a first key $K_{w11}^0$ for binary value 0 and a second key $K_{w11}^1$ for binary value 1. The $P_A$ 504 repeats this operation for all wires of all gates. In performing this operation, the $P_A$ 504 can rely on any key generation module 304 to generate random keys, for example, without limitation, the Advanced Encryption Standard (AES) algorithm, using cipher-block chaining (CBC) mode.

The keys for some wires in lower layers may be defined by the keys already chosen for respective parent layers. For example, consider the keys for gate $g_3$. Gate $g_3$ includes input wires which correspond to the output wires of gates $g_1$ and $g_2$. The $P_A$ 504 has already assigned keys $K_{w13}^0$ and $K_{w13}^1$ to the first input wire and the keys $K_{w23}^0$ and $K_{w23}^1$ to the second input wire. Hence, these same keys are used as the input wires to gate $g_3$. However, the $P_A$ 504 assigns new keys ($K_{33}{}^0$ and $K_{w33}{}^1$) to the output wire $w_{33}$ of the third gate.

In the next phase of action 604, the $P_A$ 504 garbles all of the gates in the Boolean circuit on the basis of the keys that have been assigned. The right-hand portion of FIG. 8 illustrates one way to perform this encryption for gates $g_1$, $g_2$, and $g_3$. To repeat, assume that each of the gates is an AND gate. Each AND gate receives two inputs and generates an output, providing four possible input-output scenarios: inputs (0, 0) yielding an output 0; inputs (0, 1) yielding an output 0; inputs (1, 0) yielding an output 0; and inputs (1, 1) yielding an output 1. The $P_A$ 504 provides an encryption value for each such permutation based on the keys. For example, consider the first input-output permutation for gate $g_1$. The encrypted value for this permutation is given by the nested encryption: $Enc_{K_{w11}{}^0}(Enc_{K_{w12}{}^0}(K_{w13}{}^0))$. This means that the $P_A$ 504 uses the key $K_{w12}{}^0$ to encrypt the key $K_{w13}{}^0$. This produces a first result. The $P_A$ 504 then uses the key $K_{w11}{}^0$ to encrypt the first result to produce a second result. The $P_A$ 504 performs this nested encryption four times for each gate in the Boolean circuit, to yield the garbled Boolean circuit, G(Circuit).

Figure 9:
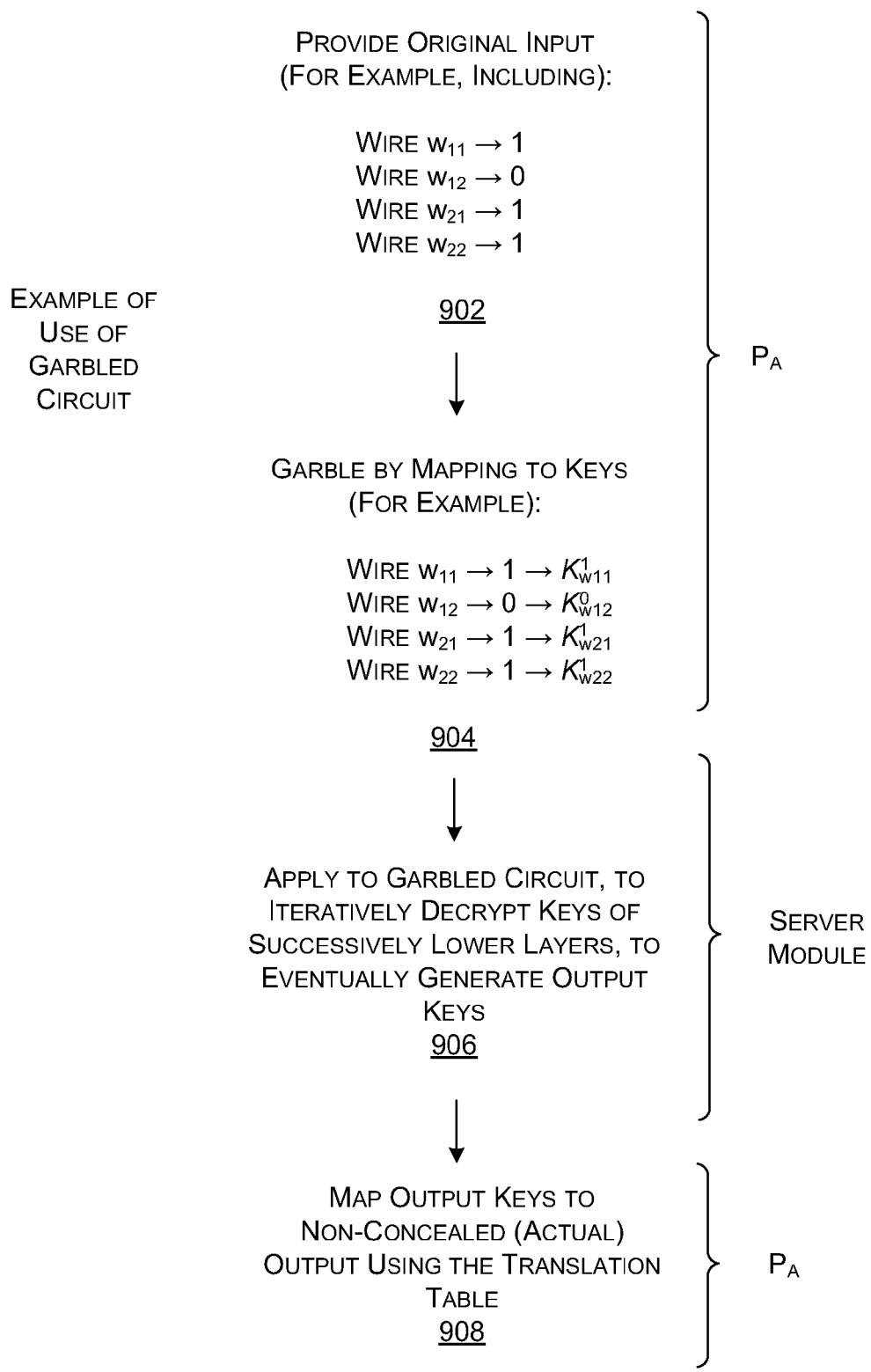
FIG. 9 illustrates one manner in which a garbled Boolean circuit can be used to evaluate an input to provide an output.

FIGS. 6B and 6C continue by describing how the garbled circuit can be used to provide an output result. Before that more detailed explanation, however, FIG. 9 provides an overview of this operation with respect to a simplified example. Namely, in this simplified example, the server module 502 processes a garbled circuit based on a single garbled input provided by $P_A$ 504. (But in general, the server module 502 can receive and process two inputs provided by separate participant modules, e.g., as supplied by $P_A$ 504 and $P_B$ 506, respectively.)

In action 902, assume that the $P_A$ 104 identifies a non-concealed input string. Assume that this input string includes, as part thereof, the bit string 1011 to be fed to wires $w_{11}$, $w_{12}$, $w_{21}$, and $w_{22}$ of the Boolean circuit. In action 904, the $P_A$ 504 garbles the input string. This operation comprises mapping the input bits to the corresponding keys that have been assigned to these wires. This mapping process produces a garbled input that includes, in part, the keys $K_{w11}{}^1$, $K_{w12}{}^0$, $K_{w21}{}^1$, and $K_{w22}{}^1$. The $P_A$ 504 can then pass the garbled input to the server module 502.

In action 906, the server module 502 operates on the garbled input to generate a garbled output. For example, consider the isolated case of the input of keys $K_{w11}{}^1$ and $K_{w12}{}^0$ supplied to gate $g_1$. Possession of these keys allows the server module 502 to decrypt the key for the output wire $w_{13}$, namely $K_{w13}{}^0$. Similarly, possession of keys $K_{w21}{}^1$ and $K_{w22}{}^1$ allows the server module 502 to decrypt the key for the output wire $w_{23}$, namely $K_{w23}{}^1$. At this point, the server module 502 has extracted the keys for the input wires to gate $g_3$, which allows it to decrypt the key $K_{w33}{}^0$ for the output wire $w_{33}$. This process continues in an iterative manner until the server module 502 extracts a final set of keys for the gates in the last layer. The server module 502 can then pass these keys to the appropriate recipient, e.g., the $P_A$ 504. This output is in concealed form because it does not reveal the actual output values corresponding to the keys. In block 908, the recipient(s) of the concealed output (e.g., $P_A$ 504) uses a translation table to map the keys in the output to associated actual bit values.

Note that a particular input string selectively empowers the server module 502 to only provide a specific output result. That is, the server module 502 is not in a position to perform computations unless it has keys corresponding to corresponding input values. In practice, the sever module 502 can use its set of received keys to try to decrypt what it can; some of these decryptions will work, while some will not. Thus, the server module 502 can proceed without "knowing" the meaning that is attached to each key (for example, whether a key is associated with a 0 bit or a 1 bit, etc.).

With the above introduction, the explanation continues with a description of FIG. 6B. In action 616, $P_A$ 504 garbles its own input ($x_A$) to produce the garbled input $G(x_A)$, where $x_A$ corresponds to a string of bits. In the terminology developed in Section A, this garbled input constitutes a concealed input. As described in connection with the example of FIG. 9, garbling an input constitutes mapping keys to bits in the input. In action 618, the $P_A$ 504 sends its garbled input $G(x_A)$ to the server module 502. In action 620, the server module 502 receives the garbled input $G(x_A)$.

The next actions, enclosed by a dashed-line box, correspond to a three-way oblivious transfer technique 622. The three-way oblivious transfer technique 622 operates to handle a cooperative communication among $P_A$ 504, $P_B$ 506, and the server module 502 so as to transfer a garbed input $x_B$ from $P_B$ 506 to the server module 502, where $x_B$ corresponds to a strings of bits).

This transfer is qualified in the following manner. First, the transfer is performed in such a manner that $P_A$ 504 does not learn the input ($x_B$) of $P_B$ 506, and vice versa. Second, the server module 502 does not learn of anyone's inputs (in non-concealed form). This task is challenging because $P_A$ 504 is the agent which has generated the encryption keys for the wires. Thus, $P_B$ 506 is asked to conceal its inputs without having knowledge of the keys. The $P_A$ 504 can transfer all the keys to the $P_B$ 506, but this would empower the $P_B$ 506 to examine more information than it is entitled to possess. $P_A$ 504 can transfer a subset of the appropriate keys to $P_B$ 506, but this would inform $P_A$ 504 of the input $x_B$ of $P_B$ 506.

Stated in another way, $P_B$ 506 seeks to select certain keys from the complete set of keys provided by $P_A$ 504. But $P_B$ 506 does not want $P_A$ 504 to know what keys it has selected. Further, $P_A$ 504 does not want to divulge to $P_B$ 506 the keys that are not being selected.

In action 624, the $P_B$ 506 begins a process by which it transfers its garbled input to the sever module 502. However, as explained above, the $P_B$ 506 cannot perform this function in as direct a manner as $P_A$ 504, because it does not possess any of the keys to perform the mapping. So, in action 624, the $P_B$ 506 begins by generating secret keys and corresponding public keys for the input wires in the Boolean circuit (using the processing modules 310 associated with a public encryption scheme). That is, for a given input wire, the $P_B$ 506 generates two key pairs. The first pair comprises a secret key $sk_0$ and a public key $pk_0$ (associated with bit 0). A second pair (for the same wire) comprises a secret key $sk_1$ and public key $pk_1$ (associated with bit 1). In action 626, the $P_B$ 506 sends just the public keys to the $P_A$ 504. In action 626, the $P_A$ 504 receives these public keys.

In action 620, the $P_A$ 504 uses the received public keys to encrypt corresponding Boolean circuit input keys (that have been previously assigned to the input wires). For example, consider the key $K_{w11}{}^0$ corresponding to input wire $w_{11}$, associated with bit 0. The $P_A$ 504 encrypts this key using the corresponding public key provided by $P_B$ 506 to provide a ciphertext c. This produces a plurality of ciphertexts (c's). In action 632, the $P_A$ 504 permutes these ciphertexts into a random order. In action 634, the $P_A$ 504 transfers the permuted ciphertexts to the server module 502. In action 636, the $P_A$ 504 receives the ciphertexts.

Next, in action 636, the $P_B$ 506 sends appropriate secret keys (sk's) corresponding to its own input (e.g., $x_B$) to the server module 504. In other words, the $P_B$ 506 does not send all of the secret keys, but just those secret keys that map to the bits of $x_B$. For example, if a particular wire is fed an input bit of 0 by $x_B$, then $P_B$ 506 sends the secret key for this particular wire that corresponds to the 0 bit. In action 638, the server module 504 receives the selected secret keys (sk's).

The three-way oblivious transfer technique concludes in action 642 (of FIG. 6C). Here, the server module 502 reconstructs the garbled input for $x_B$, e.g., $G(x_B)$, based on the public keys transferred by $P_A$ 504 and the secret keys transferred by $P_B$ 506. This transfer has been performed without $P_A$ 504 or the server module 502 learning about the actual input $x_B$. And this transfer has been performed without $P_B$ 506 receiving any keys. In practice, the server module 502 need not know how the secret keys pair up with the ciphertexts. It just tries to decrypt the received ciphertexts based on the secret keys that it receives; some attempts will be successful and others will not.

In action 644, the server module 502 finally can feed the two garbled inputs, $G(x_A)$ and $G(x_B)$ to the garbled Boolean circuit G(Circuit). Upon evaluation, this produces a garbled output $G(\bar{y})$, which corresponds to a sequence of output keys produced by the garbled Boolean circuit. (Generally, the symbol $\bar{x}$ as used in this explanation denotes a vector having plural elements, e.g., $x_1, x_2, \ldots x_n$.) In one scenario, the garbled Boolean circuit produces a symmetric output, meaning that the same garbled output is delivered to each participant module. In another case, the garbled Boolean circuit produces an output that has multiple parts. One part ($y_A$) represents an output to be sent to $P_A$ 504 and another part ($y_B$) represents an output to be sent to the $P_B$ 506.

Accordingly, in action 646, the server module 502 sends garbled output $y_A$ to $P_A$ 504 and garbled output $y_B$ to $P_B$ 506, where $y_A$ may be the same as or different than $y_B$. In action 648, the $P_A$ 504 receives the garbled input $y_A$. In action 650, the $P_B$ 506 receives the garbled output $y_B$.

In action 652, the $P_A$ 504 uses the translation table to map the garbled output $y_A$ (which comprises a series of keys) to an actual (non-concealed) bit stream. In action 654, the $P_B$ 506 performs a similar function with respect to garbled output $y_B$.

C. Implementation II

Figure 10:
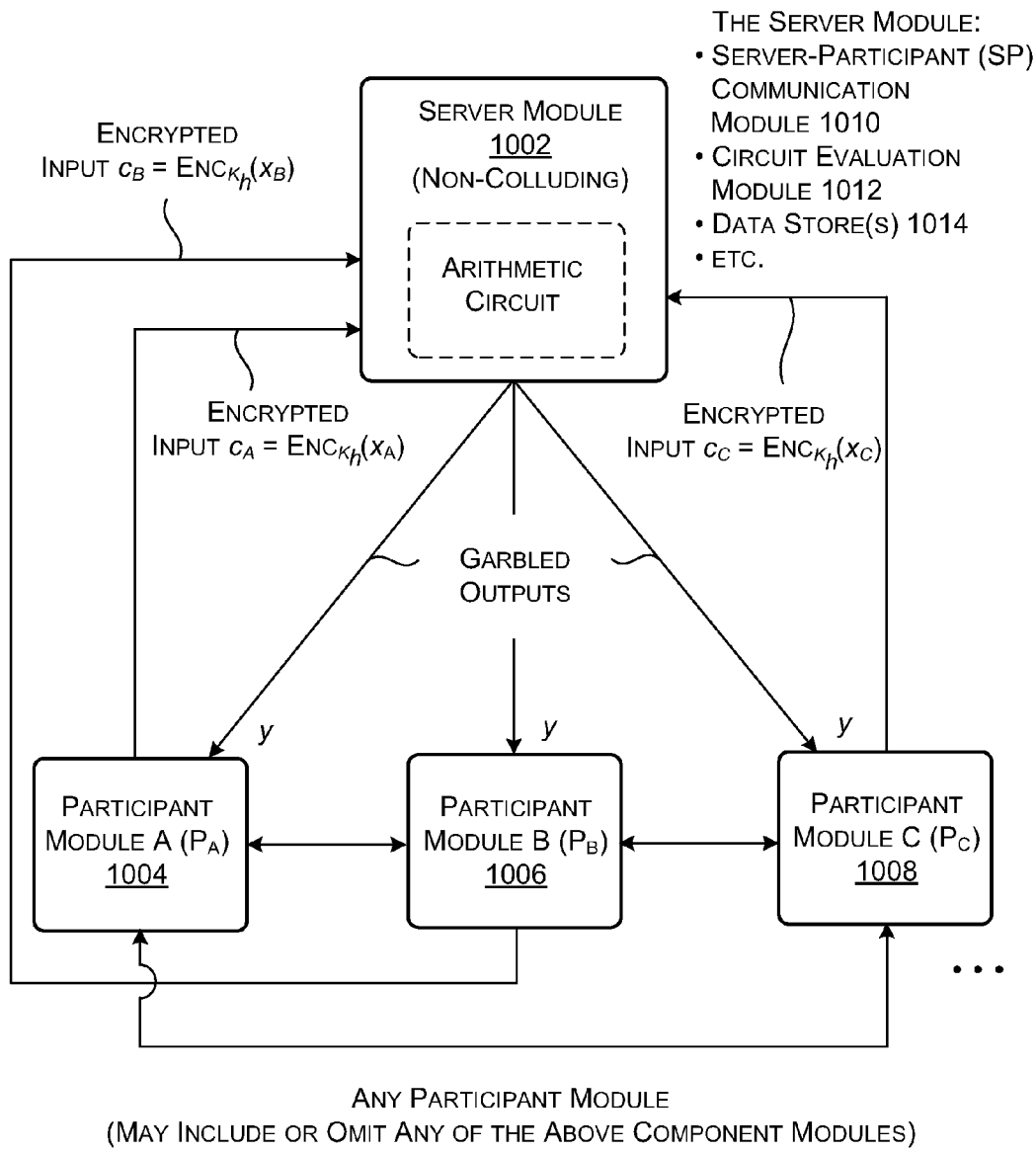
FIG. 10 shows an illustrative system associated with the second implementation.

FIG. 10 shows a system 1000 that represents a second implementation of the general principles set forth in Section A. In this case, a server module 1002 evaluates an arithmetic circuit based on concealed inputs, rather than a Boolean circuit. An arithmetic circuit includes gates that perform addition, multiplication, etc.

The server module 1002 communicates with any number of participant modules, such as, without limitation, participant module A 1004 ($P_A$), participant module B 1006 ($P_B$), and participant module C 1008 ($P_C$). In one illustrative scenario, it is assumed that the server module 1002 is potentially untrustworthy, but that it does not collude with any of the participant modules.

The server module 1002 can include a number of component modules enumerated in FIG. 10. The component modules can include: a server-participant (SP) communication module 1010 for communicating with the participant modules; a circuit evaluation module 1012 for evaluating the arithmetic circuit based on encrypted inputs (e.g., numbers) received from the participant modules (e.g., using the addition module 410 and the multiplication module 412 of FIG. 4); one or more data stores 1014, etc.

Any of the participant modules can likewise include a number of component modules. The component modules can include: a participant-server (PS) communication module 1016 for communicating with the server module 1002; a participant-participant (PP) module 1018 for communicating with other participant modules; a generating module 1020 (e.g., corresponding to the generating module 404 of FIG. 4) for generating a key (and, optionally, a modifier factor $\pi$); an input concealment module 1022 for concealing (e.g., encrypting) an input (e.g., corresponding to the encryption module 406 of FIG. 4); an output evaluation module 1024 for decrypting the output of the arithmetic circuit (e.g., corresponding to the decryption module 408 of FIG. 4); one or more data stores 1026, etc.

Figure 11:
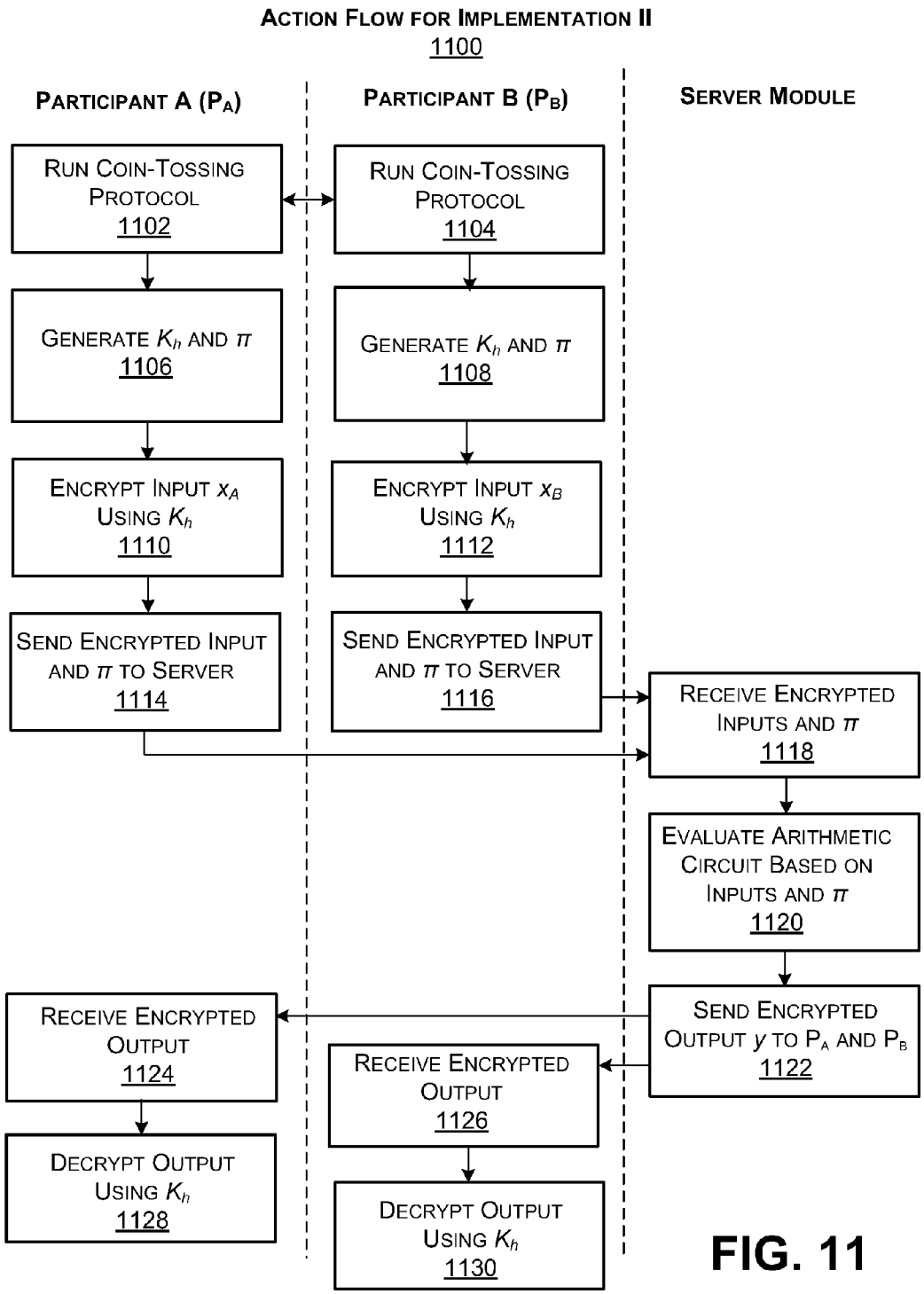
FIG. 11 is a diagram that sets forth an illustrative action flow of the system of FIG. 10.

FIG. 11 shows an illustrative action flow 1100 that describes one manner of operation of the system 1000 of FIG. 1. To facilitate explanation, FIG. 11 shows the operation of system 1000 with respect to only $P_A$ 1004 and $P_B$ 1006. However, the same principles described herein can be extended for the case in which there is more than three participant modules, or the case in which there is only one participant module.

In actions 1102 and 1104, each of the participant modules ($P_A$ 1004 and $P_B$ 1006) can run a distributed coin tossing protocol. This result in each participant module generating the same random string r.

In actions 1106 and 1108, each of the participant modules ($P_A$ 1004 and $P_B$ 1006) uses the random string r and a security parameter k to generate a key $K_h$. This key is produced using the generating module 404 of FIG. 4 of the fully homomorphic encryption technique; as stated above, this key is assigned the subscript "h" to distinguish it from the key described in Section A. More specifically, each participant module generates the same key because each participant module applies the same inputs to the generating process (i.e., r and k). $P_A$ 1004 and $P_B$ 1006 also generate the same modifier factor ($\pi$).

A fully homomorphic encryption technique has the following properties, defined with respect to an add (Add) operation and a multiplication (Mult) operation. To simplify, the explanation will first omit the role of the modifier factor ($\pi$). The add operation, Add($\bar{c_1}, \bar{c_2}$,), is a deterministic algorithm that takes as input two ciphertexts ($\bar{c_1}, \bar{c_2}$) and outputs a ciphertext $\bar{c_3}$ such that $m_1+m_2$ equals the decryption of (using $K_h$), where $m_1$ is the decryption of $c_1$ (using $K_h$) and $m_2$ is the decryption of $c_2$ (using $K_h$). The multiplication operation, Mult($\bar{c_1}, \bar{c_2}$,), is a deterministic algorithm that takes as input two ciphertexts ($\bar{c_1}, \bar{c_2}$) and outputs a ciphertext $\bar{c_3}$ such that $m_1 \times m_2$ equals the decryption of $\bar{c_3}$ (using $K_h$), where, again, $m_1$ is the decryption of $c_1$ (using $K_h$) and $m_2$ is the decryption of $c_2$ (using $K_h$). The system 1000 can leverage this property in the manner described below. Additional information regarding the modifier factor ($\pi$) is provided below.

In action 1110, the $P_A$ 1004 encrypts its input $x_A$ using the key $K_h$ to produce ciphertext $c_A$. In action 1112, the $P_B$ 1006 encrypts its input $x_B$ using the key $K_h$ to produce ciphertext $c_B$. In actions 1114 and 1116, the $P_A$ 1004 and $P_B$ 1006 send the ciphertexts ($c_A, c_B$) to the server module 1002. The $P_A$ 1004 and $P_B$ 1006 also send the modifier factor ($\pi$) to the server module 1002 (although, in another embodiment, only one of the participant modules sends the modifier factor to the server module 1002, since each participant module produces the same modifier factor). In action 1118, the server module 1002 receives these ciphertexts and modifier factor(s).

In action 1120, the server module 1002 evaluates the arithmetic circuit based on the encrypted inputs received in action 1116. This produces an encrypted output, y. In action 1122, the server module 1002 sends the encrypted output y to the $P_A$ 1004 and the $P_B$ 1006. In actions 1124 and 1126, the $P_A$ 1004 and $P_B$ 1006 receive the encrypted output y.

In action 1128, the $P_A$ 1004 decrypts the encrypted output y using the key $K_h$. Likewise, in action 1130, the $P_B$ 1006 decrypts the encrypted output using the key $K_h$. This is possible because of the characteristics of the fully homomorphic encryption technique described above. Namely, even though the original encrypted inputs may have been transformed using several addition and multiplication operations, the same key can be used to decrypt the final output result.

Recall, based on the introduction provided with respect to FIG. 4, that the encryption scheme of the second implementation is defined with respect to five processing modules that make up the fully homomorphic encryption technique: a generating module 404; an encryption module 406; a decryption module 408; an addition module 410; and a multiplication module 412. The remaining figures in this section provide additional details regarding each of these modules, and, in doing so, further clarify the nature of the key and use thereof.

Beginning with FIG. 12, this figure describes an operation 1202 that generates a key, as performed by the generating module 404. The generating operation 1202 can be used in conjunction with the system 1000 of FIG. 10; but it can also be used in other encryption-related environments, including those environments which do not involve two-party or multiparty computation.

In action 1204, the generating module 404 provides a plurality of a values. These values correspond to locations along the x-axis of a polynomial function to be created in the encryption process. Note FIG. 14 for a graphical depiction of the a values in relation to an illustrative polynomial function. The encryption process (to be described below) will evaluate the polynomial function at these a values to produce a plurality of polynomial values, e.g., $p(\alpha_1)$, $p(\alpha_2)$, $p(\alpha_3)$, etc. The generating module 404 provides the set of a values by uniformly sampling from a field F, e.g., $\overline{\alpha} \leftarrow F^{2k+1}$, where k is a security parameter.

In action 1206, the generating module 406 provides a set of noise indices (N). These indices identify random locations of noise values (where the noise values will be added, during encryption, to a ciphertext based on the random locations in the key $K_h$). In one implementation, the generating module 406 can uniformly select n of these noise indices at random from a range (2k+1+n).

In action 1208, the generating module 406 forms the key $K_h$ based on a combination of $\overline{\alpha}$ and N. In other words, the key $K_h(\overline{\alpha}, N)$ includes a plurality of x-axis locations (e.g., comprising the elements of $\overline{\alpha}$), along with a plurality of noise indices that describe the placement of noise values (e.g., comprising the elements of N).

In action 1210, the generating module 406 generates a modifier factor $\pi$. The modifier factor $\pi$ is a parameter that is produced by at least one of the participant modules (or some other entity), and provided to the server module 1002; thus the modifier factor is considered a public parameter. As will be described in greater detail below, the server module 1002 uses the modifier factor $\pi$ each time it multiplies two ciphertexts together using component-wise multiplication (for reasons described below).

FIG. 13 shows operations performed by the encryption module 406. Generally, as indicated in action 1302, the encryption module 406 uses the key $K_h$ to encrypt a message m (where the message here refers to a value within some range, not an individual bit). In action 1304, the encryption module 406 begins by generating a random univariate polynomial p such that p(0)=m. In other words, the polynomial p is chosen such that the value at $\alpha$=0 is equal to the message to be encrypted, m. Note FIG. 14 for a graphical illustration of this concept.

In action 1306, the encryption module 406 generates the ciphertext $\overline{c}$ using the key as follows. In particular, consider the generation of an element $c_i$ of the ciphertext $\overline{c}$. If this element corresponds to a non-noise location (e.g., i∉N), then $c_i$=p($\alpha_i$). This means that $c_i$ equals the value of the polynomial p evaluated at $\alpha_i$, where $\alpha_i$ is one of the elements of $\overline{\alpha}$. If $c_i$ corresponds to a noise location (e.g., i∈N), then $c_i$ is set to some random noise value, $s_i$.

FIG. 15 shows a decryption operation 1502 performed by the decryption module 408. In action 1504, the decryption module 408 is provided with a ciphertext that includes a plurality of polynomial values at non-noise locations, interspersed with noise values. The key $K_h$ identifies the location of noise values in ciphertext $\overline{c}$, which implicitly also identifies the locations of the p($\alpha_i$) values. Based on this information (namely, the $\overline{\alpha}$ and the p($\alpha_i$) values), the decryption module 408 performs interpolation to reconstruct the polynomial function, e.g., as shown in FIG. 14.

In action 1506, the decryption module 408 then evaluates the reconstructed polynomial function at $\alpha$=0 to extract the original message, e.g., p(0)=m.

FIG. 16 shows an addition operation 1602 performed by the addition module 410 and a multiplication operation 1604 performed by the multiplication module 412. The server module 1002 calls on the addition module 410 when evaluating a gate that performs addition in the arithmetic circuit. The server module 1002 calls on the multiplication module 412 when evaluating a gate that performs multiplication in the arithmetic circuit. The addition operation 1602 produces a result that can be decrypted using the same key used to produce the encrypted input values (e.g., $\overline{c_1}$ and $\overline{c_2}$). Similarly, the multiplication operation 1604 produces a result that can be decrypted using the same key used to produce the encrypted input values. These addition and multiplication operations can be performed on a component-by-component basis. For example, if each of the ciphertexts ($\overline{c_1}$ and $\overline{c_2}$) includes plural components, the addition operation involves adding components of $\overline{c_1}$ with corresponding components of $\overline{c_2}$ to produce a result. Similarly, multiplication involves multiplying components of $\overline{c_1}$ with corresponding components of $\overline{c_2}$ to produce a result, and then multiplying that result by the modifier factor $\pi$.

More specifically, in the course of evaluating the arithmetic circuit, the multiplication operation 1604 modifies each multiplication result (e.g., produced by the component-wise multiplication $\overline{c_1} \times \overline{c_2}$) by the modifier factor, $\pi$. The multiplication module 412 performs this task to reduce the degree of an underlying polynomial function associated with the result of multiplication. A large degree for a polynomial function is undesirable because this increases the number of samples needed to perform effective interpolation of the polynomial function (in the decryption process). This, in turn, requires the use of a large key, $K_h$. By modifying each product of multiplication by $\pi$, the sever module 1002 can keep the degree in check, e.g., without it growing in linear proportion with the number of multiplications that are performed. As a consequence, the server module 1002 need not place any a-priori bounds on the number of multiplications that can be performed in the course of evaluating the arithmetic circuit. And thus, the approach described herein overcomes limitations of a version of fully homomorphic encryption described, for example, in F. Armknecht and A. R. Sadeghi, "A New Approach for Algebraically Homomorphic Encryption," Technical Report 2008/422, IACR ePrint Cryptography Archive, 2008.

There are different ways to generate the modifier factor $\pi$. Generally, the modifier factor is designed to satisfy two aims. First, the modifier factor is designed to reduce the degree of an underlying polynomial function that is associated with a product of a multiplication operation. Second, the modifier factor is designed so as not to disclose any information about the construction of the key $K_h$. More specifically, $\pi$ is designed so as not to disclose the location of the noise elements in a ciphertext (as governed by N in the key $K_h$).

One algorithm for generating the modifier factor $\pi$ is given by: $\pi = V^N(\overline{\alpha}) \cdot R \cdot P \cdot V_N(\overline{\alpha})^{-1}$.

1. In this equation, let $V_N(\overline{\alpha})^{-1}$ be the $(2k+1) \times (2k+1+n)$ matrix that results from augmenting the inverse of the Vandermonde matrix $V(\overline{\alpha})$ with 0-columns at locations $j \in N$. A Vandermonde matrix is a matrix having rows that provide elements associated with a geometric progression.

2. Let P be the projection matrix that maps $(2k+1)$-dimensional vectors $\overline{v}$ to $(k+1)$-dimensional vectors $\overline{v}' = (v_1, \ldots, v_{2k+1}, 0, \ldots, 0)$. The $(2k+1) \times (2k+1)$ matrix P is obtained by extending the $(k+1) \times (k+1)$ identity matrix with k 0-columns and 0-rows.

3. Let R be the $(2k+1) \times (2k+1)$ matrix obtained by replacing the 1's in rows 2 thrown k+1 of the $(2k+1) \times (2k+1)$ identity matrix with random values in F.

4. Let $V^N(\overline{\alpha})$ be the $(2k+1+n) \times (2k+1)$ matrix obtained by adding random rows to the Vandermonde matrix $V(\overline{\alpha})$ at locations $i \in N$.

D. Representative Processing Functionality

FIG. 17 sets forth illustrative electrical data processing functionality 1700 that can be used to implement any aspect of the functions described above. With reference to FIGS. 1, 5, and 10, for instance, the type of processing functionality 1700 shown in FIG. 17 can be used to implement any aspect of a server module, and/or any aspect of a participant module. In one case, the processing functionality 1700 may correspond to any type of computing device that includes one or more processing devices.

The processing functionality 1700 can include volatile and non-volatile memory, such as RAM 1702 and ROM 1704, as well as one or more processing devices 1706. The processing functionality 1700 also optionally includes various media devices 1708, such as a hard disk module, an optical disk module, and so forth. The processing functionality 1700 can perform various operations identified above when the processing device(s) 1706 executes instructions that are maintained by memory (e.g., RAM 1702, ROM 1704, or elsewhere). More generally, instructions and other information can be stored on any computer readable medium 1710, including, but not limited to, static memory storage devices, magnetic storage devices, optical storage devices, and so on. The term computer readable medium also encompasses plural storage devices.

The processing functionality 1700 also includes an input/output module 1712 for receiving various inputs from a user (via input modules 1714), and for providing various outputs to the user (via output modules). One particular output mechanism may include a presentation module 1716 and an associated graphical user interface (GUI) 1718. The processing functionality 1700 can also include one or more network interfaces 1720 for exchanging data with other devices via one or more communication conduits 1722. One or more communication buses 1724 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for performing a function by a server module, the method comprising:
    obtaining a concealed version of a Boolean circuit at the server module, the Boolean circuit implementing the function using a collection of gates;
    receiving a first concealed input from a first participant module;
    using a three-way oblivious transfer technique to receive a second concealed input from a second participant module, the three-way oblivious transfer technique comprising reconstructing the second concealed input using ciphertexts associated with input wires of the Boolean circuit and secret keys associated with a non-concealed input of the second participant module;
    evaluating the concealed version of the Boolean circuit based on the first concealed input and the second concealed input to generate a concealed output; and
    sending the concealed output from the server module to the first participant module or the second participant module, wherein the concealed output that is sent from the server module to the first participant module or the second participant module does not reveal actual output values of the evaluating to the server module,
    wherein the server module is embodied on a computing device that performs at least the evaluating.

2. The computer-implemented method of claim 1, wherein the concealed version of the Boolean circuit is a garbled Boolean Circuit that is produced using a set of keys associated with the gates.

3. The computer-implemented method of claim 1, wherein said receiving of the first concealed input comprises receiving a garbled input from the first participant module, the garbled input comprising a collection of input keys that map to a non-concealed input of the first participant module.

4. The computer-implemented method of claim 1, wherein receiving of the second concealed input comprises:
    receiving the ciphertexts from the first participant module, wherein the ciphertexts have been encrypted using public keys provided to the first participant module by the second participant module; and
    receiving the secret keys from the second participant module.

5. The computer-implemented method of claim 4, wherein the ciphertexts are permuted in a random order.

6. The computer-implemented method of claim 4, wherein the second concealed input that is reconstructed comprises a garbled input, the garbled input comprising a collection of input keys that map to the non-concealed input of the second participant module.

7. The computer-implemented method of claim 1, wherein said evaluating of the concealed version of the Boolean circuit comprises using the concealed version of the Boolean circuit to perform a joint computation based on the first concealed input and the second concealed input.

8. The computer-implemented method of claim 1, wherein the concealed output comprises a garbled output, the garbled output comprising a collection of output keys.

9. The computer-implemented method of claim 1, wherein said sending of the concealed output comprises sending a first concealed output to the first participant module and sending a second concealed output to the second participant module, wherein the first concealed output differs from the second concealed output.

10. The computer-implemented method of claim 1, wherein:
- the computing device is implemented as a resource within a cloud computing system,
- the concealed version of the Boolean circuit is received directly from the first participant module,
- the first concealed input is received directly from the first participant module,
- the secret keys are received directly from the second participant module, and
- the concealed output is sent directly to the first participant module and the second participant module.

11. A system comprising:
a first participant module configured to:
- garble a Boolean circuit to produce a concealed version of the Boolean circuit, wherein the Boolean circuit implements a function using a collection of gates having corresponding input keys,
- send the concealed version of the Boolean circuit to a server module,
- send a first concealed input to the server module,
- implement a three-way oblivious transfer technique, wherein, to implement the three-way oblivious transfer technique, the first participant module is further configured to:
  - receive public keys from a second participant module,
  - encrypt the input keys corresponding to the collection of gates using the public keys received from the second participant module to produce ciphertexts, and
  - send the ciphertexts to the server module, wherein the server module is configured to use the first concealed input and the ciphertexts to generate a concealed output of the concealed version of the Boolean circuit,
- produce a translation table that maps the concealed output to an actual non-concealed output result, and
- send the translation table to the second participant module; and
at least one processing device configured to execute the first participant module.

12. The system according to claim 11, further comprising the server module and the second participant module.

13. The system according to claim 11, wherein the first participant module is further configured to generate the Boolean circuit.

14. The system according to claim 11, wherein the first participant module is not configured to send the translation table to the server module that generates the concealed output.

15. One or more computer readable memory devices or storage devices storing computer readable instructions, the computer readable instructions providing a second participant module when executed by one or more processing devices, the computer readable instructions comprising logic configured to:
- receive a translation table from a first participant module;
- generate secret keys and corresponding public keys for input wires of a Boolean circuit;
- send the public keys for the input wires of the Boolean circuit to the first participant module;
- send individual secret keys to a server module, wherein the server module is configured to evaluate a concealed version of the Boolean circuit based on a first concealed input of the first participant module and a second concealed input of the second participant module to generate a concealed output, wherein the individual secret keys sent to the server module map to the second concealed input;
- receive the concealed output from the server module; and
- use the translation table received from the first participant module to map the concealed output received from the server module to an actual non-concealed output of the Boolean circuit,
wherein some of the public keys sent to the first participant module do not correspond to any of the individual secret keys sent to the server module.

16. The one or more computer readable memory devices or storage devices of claim 15, wherein the logic is further configured to:
for a particular input wire of the Boolean circuit:
- send multiple public keys to the first participant module, the multiple public keys being associated with multiple values for the particular input wire; and
- send a particular secret key to the server module that corresponds to an individual value for the particular input wire.

17. The one or more computer readable memory devices or storage devices of claim 16, wherein the multiple public keys include a first public key associated with a bit value of zero for the particular input wire and a second public key associated with a bit value of one for the particular input wire.

18. The one or more computer readable memory devices or storage devices of claim 17, wherein the particular secret key is associated with the bit value of zero.

19. The one or more computer readable memory devices or storage devices of claim 18, wherein the logic is configured to generate another secret key associated with the bit value of one for the particular input wire of the Boolean circuit but not send the another secret key to the server module.

20. A system comprising the one or more computer readable memory devices or storage devices of claim 15 and the one or more processing devices.

* * * * *